United States Patent
Kaneda et al.

(10) Patent No.: US 9,496,532 B2
(45) Date of Patent: Nov. 15, 2016

(54) POROUS MEMBRANE FOR SECONDARY BATTERY, PRODUCTION METHOD THEREFOR, AND USE THEREOF

(75) Inventors: Takuya Kaneda, Tokyo (JP); Osamu Kobayashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 457 days.

(21) Appl. No.: 13/814,522

(22) PCT Filed: Aug. 8, 2011

(86) PCT No.: PCT/JP2011/068086
§ 371 (c)(1),
(2), (4) Date: Feb. 6, 2013

(87) PCT Pub. No.: WO2012/020737
PCT Pub. Date: Feb. 16, 2012

(65) Prior Publication Data
US 2013/0130123 A1 May 23, 2013

(30) Foreign Application Priority Data

Aug. 9, 2010 (JP) ................................. 2010-178813
Sep. 28, 2010 (JP) ................................. 2010-217859

(51) Int. Cl.
H01M 2/16 (2006.01)
H01M 4/64 (2006.01)
H01M 2/14 (2006.01)

(52) U.S. Cl.
CPC ............... *H01M 2/16* (2013.01); *H01M 2/145* (2013.01); *H01M 2/1653* (2013.01); *H01M 4/64* (2013.01)

(58) Field of Classification Search
CPC ................................. H01M 2/14; H01M 2/16

USPC ................................. 429/247, 249, 251–252
See application file for complete search history.

(56) References Cited

U.S. PATENT DOCUMENTS

| 2009/0029261 A1* | 1/2009 | Thomas-Alyea et al. ..... 429/248 |
| 2010/0248026 A1* | 9/2010 | Hinoki et al. ................ 429/209 |
| 2011/0052987 A1* | 3/2011 | Katayama et al. ........... 429/221 |

(Continued)

FOREIGN PATENT DOCUMENTS

| JP | 2002-265657 A | 9/2002 |
| JP | 2003-178756 A | 6/2003 |

(Continued)

OTHER PUBLICATIONS

Krupa, I., and A.s. Luyt. "Thermal properties of isotactic polypropylene degraded with gamma irradiation." Polymer Degradation and Stability 72.3 (2001): 505-08.*

(Continued)

*Primary Examiner* — James Lee
(74) *Attorney, Agent, or Firm* — Birch, Stewart, Kolasch & Birch, LLP

(57) ABSTRACT

A porous membrane for a secondary battery including non-electroconductive particles and a binder for a porous membrane, wherein the non-electroconductive particles are particles of a polymer, an arithmetic mean value of a shape factor of the non-electroconductive particles is 1.05 to 1.60, a variation coefficient of the shape factor is 16% or less, and a variation coefficient of a particle diameter of the non-electroconductive particles is 26% or less; manufacturing method thereof; and an electrode, a separator and a battery having the same.

9 Claims, 3 Drawing Sheets

(56) References Cited

U.S. PATENT DOCUMENTS

2011/0318630 A1* 12/2011 Wakizaka ........... H01M 2/1653
429/144
2012/0305861 A1 12/2012 Albrecht et al.

FOREIGN PATENT DOCUMENTS

| JP | 2005-327680 A | 11/2005 |
| JP | 2006-139978 A | 6/2006 |
| JP | 2007-294437 A | 11/2007 |
| JP | 2009-64566 A | 3/2009 |
| JP | 2009-515799 A | 4/2009 |
| JP | 2010-15917 A | 1/2010 |
| JP | 2010-225544 A | 10/2010 |
| WO | 2007/019986 A1 | 2/2007 |
| WO | WO 2010/074202 * | 7/2010 ............. H01M 2/16 |
| WO | WO 2010/134501 A1 | 11/2010 |

OTHER PUBLICATIONS

"Encyclopedia of Polymers," Asakura Publishing Co. Ltd., 1998, p. 450 with English translation (3 pages total).

Japanese Office Action, with English translation thereof, dated Feb. 10, 2015, for Japanese Application No. 2012-528671.

International Search Report issued PCT/JP2011/068086, mailed on Nov. 8, 2011.

Written Opinion of the International Searching Authority issued in PCT/JP2011/068086, mailed on Nov. 8, 2011.

* cited by examiner

POROUS MEMBRANE FOR SECONDARY BATTERY, PRODUCTION METHOD THEREFOR, AND USE THEREOF

FIELD

The present invention relates to a porous membrane for a secondary battery and a manufacturing method therefor, as well as an electrode, a separator, and a secondary battery using the porous membrane.

BACKGROUND

A lithium ion secondary battery has the highest energy density among practical batteries and has been widely used particularly in compact electronic products. In addition, use in automobiles is also expected. For use in these applications, there has been a demand for a lithium ion secondary battery having larger capacity, longer life, and higher safety.

Generally, in the lithium ion secondary battery, an organic separator is used for preventing short circuit between a positive electrode and a negative electrode. An ordinary organic separator is composed of polyolefin materials such as polyethylene and polypropylene, and has physical property of melting at 200° C. or less. Accordingly, when an internal and/or external stimulus causes high temperature of the battery, the organic separator may undergo volume changes such as contraction and melting. Such a phenomenon may cause, e.g., short circuit between a positive electrode and a negative electrode, and discharge of electrical energy, which in turn may cause, e.g., explosion of the battery.

In order to solve these problems, there has been proposed an organic separator and/or an electrode (a positive electrode and/or a negative electrode) having a porous membrane provided thereon containing non-electroconductive particles such as inorganic fine particles. The inorganic fine particles have excellent thermal resistance and have ability to form a porous membrane with high strength (for example, Patent Literature 1 and Patent Literature 2).

However, a preparation of the inorganic fine particles inevitably contains moisture and metal ions, and it is difficult to reduce the content thereof. Contamination of the porous membrane by moisture and metal ions causes an adverse effect on battery performance, so that there is a limitation for further improvement in battery performance with the inorganic fine particles.

In order to solve such a problem, it has been proposed to use organic fine particles in place of the inorganic fine particles (Patent Literature 3 and Patent Literature 4). Since the surface of the organic fine particles can be hydrophobized by selecting monomer species to be used, moisture contamination in the porous membrane can be kept lower than the inorganic fine particles. Further, since the organic fine particles enables metal-ion-free manufacture, contamination amount of metal ions can also be reduced. Therefore, it is expected that use of the organic fine particles realizes further improvement in battery performance.

CITATION LIST

Patent Literature

Patent Literature 1: Japanese Patent Application Laid-Open No. 2007-294437 A
Patent Literature 2: Japanese Patent Application Laid-Open No. 2005-327680 A
Patent Literature 3: Japanese Patent Application Laid-Open No. 2006-139978 A
Patent Literature 4: Japanese Patent Application Laid-Open No. 2009-64566 A

SUMMARY

Technical Problem

However, the porous membrane containing the organic fine particles has problems of low strength and low ability of preventing short circuit of the battery in the environment of use at high temperatures.

In addition, the porous membrane containing the organic fine particles also has a problem in that it is difficult to attain uniform distribution of the membrane thickness and uniform distribution of the strength. Non-uniform distribution of the membrane thickness and the strength induces partial cracking or powder falling upon cutting the porous membrane in manufacture process (when the porous membrane having a large area is cut into a suitable size for use, powdered fine fragments are generated), which reduces performance of the battery.

Accordingly, it is an object of the present invention to provide a porous membrane for a secondary battery which has low contamination amount of moisture and metal ions, has a capability to realize uniform distribution of the membrane thickness and uniform distribution of the strength, and has a capability to give a secondary battery with high safety and long life; a manufacturing method thereof; as well as components of the secondary battery and the secondary battery containing such a porous membrane.

Solution to Problem

In order to solve the aforementioned problems, the present inventors have focused on the point that performance of the porous membrane differs depending on the shape of the non-electroconductive particles contained in the porous membrane for a secondary battery.

The idea of employing a certain shape of particles itself has already been described in Patent Literatures 1 and 2 in which inorganic fine particles have been studied. However, there has been hitherto considered that the preferable shape is non-spherical shapes such as a plate-like shape and a shape of linked particles.

However, as a result of studies by the present inventors, there has unexpectedly been found out that, in the case of organic fine particles, particles having a shape that is not spherical but close to the spherical shape can bring about particularly good effect, which is different from the case of the inorganic fine particles. As a result of further studies examining what cases provide such a good effect, it was found that, in addition to the shape of the particles, variation in the shape factor thereof and variation in the particle size largely affect the degree of the effect, and that a desired effect is obtainable when the particles have low variation coefficients that are not more than specific values. The present invention was accomplished based on the aforementioned findings.

That is, according to the present invention, the following is provided.

(1) A porous membrane for a secondary battery comprising non-electroconductive particles and a binder for a porous membrane, wherein
the non-electroconductive particles are particles of a polymer, an arithmetic mean value of a shape factor of the non-electroconductive particles is 1.05 to 1.60, a variation coefficient of the shape factor is 16% or less, and a variation coefficient of a particle diameter of the non-electroconductive particles is 26% or less.

(2) The porous membrane for a secondary battery according to (1), wherein:

the binder for a porous membrane is a (meth)acrylic polymer; and a content ratio of the (meth)acrylic polymer in the porous membrane for a secondary battery is 3% to 20% by weight.

(3) The porous membrane for a secondary battery according to (1) or (2), wherein a number mean particle diameter of the non-electroconductive particles is 100 to 1000 nm.

(4) The porous membrane for a secondary battery according to any one of (1) to (3), wherein a temperature at which a ratio of reduced amount of the non-electroconductive particles reaches 10% by weight when heated in a thermobalance at a heating rate of 10° C./minute under a nitrogen atmosphere is 360° C. or more.

(5) A method for manufacturing the porous membrane for a secondary battery according to any one of (1) to (4), comprising:

polymerizing a polymerizable monomer composition to obtain non-electroconductive particles having an arithmetic mean value of a shape factor of 1.05 to 1.60, a variation coefficient of the shape factor of 16% or less, and a variation coefficient of a particle diameter of 26% or less;

mixing the non-electroconductive particles, a binder for a porous membrane, and a medium to obtain a slurry for a porous membrane containing these;

applying the slurry for a porous membrane onto a substrate to obtain a slurry layer; and drying the slurry layer.

(6) The method according to (5), wherein the binder for a porous membrane is a (meth)acrylic polymer, the medium is a water-based medium, and the step of obtaining the slurry for a porous membrane includes obtaining the slurry for a porous membrane as an aqueous dispersion.

(7) An electrode for a secondary battery, comprising:

a current collector;

an electrode mixed material layer which includes an electrode active material and a binding agent for an electrode mixed material layer, the electrode mixed material layer adhering on the current collector; and the porous membrane according to any one of (1) to (4) which is formed on the surface of the electrode mixed material layer.

(8) A separator for a secondary battery comprising an organic separator layer and the porous membrane according to any one of (1) to (4) which is formed on the organic separator layer.

(9) A secondary battery comprising a positive electrode, a negative electrode, a separator, and an electrolytic solution, in which at least any of the positive electrode, the negative electrode, and the separator has the porous membrane according to any one of (1) to (4).

Advantageous Effects of Invention

The porous membrane for a secondary battery of the present invention contains as the non-electroconductive fine particles the organic fine particles having low contamination amount of moisture and metal ions while having uniform distribution of the membrane thickness and uniform distribution of the strength, and yet does not interfere with movement of ions, thereby providing a secondary battery with high safety and long life. Thus, the porous membrane for a secondary battery of the present invention as well as the electrode and the separator of the present invention comprising the porous membrane can provide a secondary battery having high safety and long life. According to the method for manufacturing the porous membrane for a secondary battery of the present invention, such a porous membrane for a secondary battery of the present invention can be easily manufactured.

DESCRIPTION OF EMBODIMENTS

Summary

Figure 1:
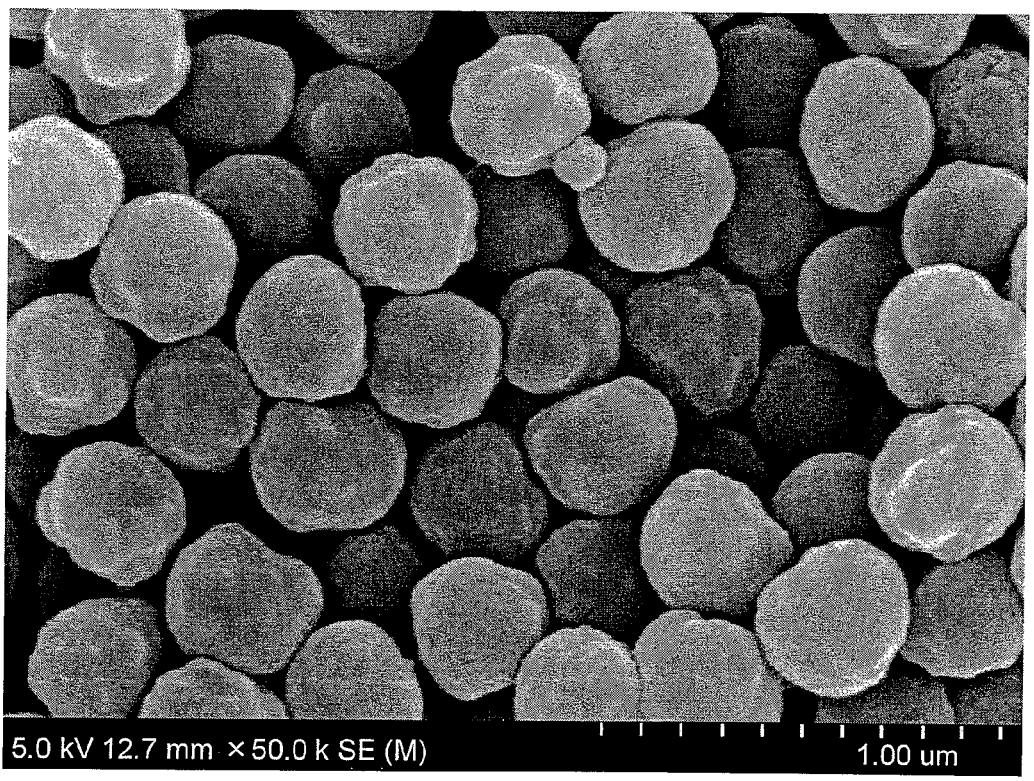
FIG. 1 is a scanning electron microscopic photograph image showing the shape of the non-electroconductive fine particles manufactured in Example 1.

The present invention will be described in detail by way of embodiments, illustrations, and others. However, the present invention is not limited to the embodiments, the illustrations and others that will be described hereinbelow and may be optionally modified and practiced without departing from the scope of the claims of the present application and the scope of their equivalents.

The porous membrane for a secondary battery of the present invention includes non-electroconductive particles and a binder for a porous membrane. In the porous membrane for a secondary battery of the present invention, the non-electroconductive particles are particles of a polymer having a specific shape.

[Shape of Non-Electroconductive Particles]

In the present invention, the non-electroconductive particles have an arithmetic mean value of shape factor, a variation coefficient of the shape factor, and a variation coefficient of a particle diameter within specific ranges. The lower limit of the arithmetic mean value of the shape factor is 1.05 or more, preferably 1.07 or more, and more preferably 1.09 or more. On the other hand, the upper limit of the arithmetic mean value of the shape factor is 1.60 or less, preferably 1.45 or less, and more preferably 1.35 or less. The upper limit of the variation coefficient of the shape factor is 16% or less, preferably 13% or less, and more preferably 10% or less. The lower limit of the variation coefficient of the shape factor is not particularly limited, but may be 0% or more. The upper limit of the variation coefficient of the particle diameter is 26% or less, preferably 23% or less, and more preferably 20% or less. The lower limit of the variation coefficient of the particle diameter is not particularly limited, but may be 0% or more.

The shape factor of the particle indicates how far the observed shape of the particle is different from a disc shape. The arithmetic mean value of the shape factor is obtained by observing the shapes of the particles to determine the shape factor for each particle in accordance with the following formula (A), and then calculating the arithmetic mean value thereof. Furthermore, in addition to the arithmetic mean value, the standard deviation is obtained and the variation coefficient is obtained therefrom.

$$\text{Shape factor}=((\text{Maximum Diameter}/2)^2 \times \pi / \text{Projected Area} \quad \text{Formula (A)}$$

In the formula, the maximum diameter refers to the particle width of the maximum distance between parallel lines when a projection image of the non-electroconductive particle on a plane surface is sandwiched by two parallel lines. The projected area refers to the area of the projection image of the non-electroconductive particles on a plane surface.

The shape of the particles is observed by photographing an image of the non-electroconductive particles magnified with a scanning electron microscope (for example, a field emission scanning electron microscope (Hitachi S-4700: produced by Hitachi High-Technologies Corporation)). The observation magnification may be appropriately adjusted in accordance with the diameter of the particles, but may be, e.g., 50000 times. The noise of the obtained image is removed and the image is analyzed using an image analysis software (for example, analySIS Pro: produced by Olympus Corporation) to thereby calculate the arithmetic mean value and the variation coefficient of the shape factor.

The number mean particle diameter of the non-electroconductive particles is measured using a laser diffraction scattering particle size distribution analyzer (for example, a trade name "LS230", produced by Beckman Coulter, Inc.). The number mean particle diameter herein refers to a particle diameter at 50% of the cumulative distribution in the particle diameter-number cumulative distribution. The variation coefficient of the particle diameter is calculated from the number mean particle diameter and the standard deviation.

The non-electroconductive particles having the arithmetic mean value of the shape factor, the variation coefficient of the shape factor, and the variation coefficient of the particle diameter of within the aforementioned respective ranges enable production of a porous membrane with uniform membrane thickness, high strength, and less inhibition against movement of ions. Without being bound to any specific theory, the reason may be supposed to be as follows.

That is, with respect to the shape factor, the shape far different from a spherical shape has been supposed to be favorable so far (e.g., Patent Literatures 1 and 2). In the case of polymer particles, however, the shape which is greatly different from that shape and closer to a spherical shape but is still a non-spherical shape can ensure the area for contact between the particles to enhance the ability to prevent short circuit of the battery at high temperatures. However, when the variation coefficient of the shape factor and the variation coefficient of the particle diameter are too large in that case, the packing density of the particles is increased, which in turn causes narrower gap between particles and force concentration at a weak portion in the layer. As a result, the resulting porous membrane is easily cracked (causing undesired cracks or powder falling at the time of cutting) and easily inhibits movement of ions. If, in addition to the shape factor, the variation coefficient of the shape factor and the variation coefficient of the particle diameter are set to values which are as low as the specific values or less, it is possible to obtain a porous membrane with few short circuit at high temperatures, uniform distribution of the strength, and less inhibition against movement of ions. Further, by employing the particles of a polymer, the contamination amount of moisture and metal ions can be reduced compared to the case of adopting the inorganic particles, which also enhances the performance of the battery.

In addition, when the shape factor is not less than a certain order, it becomes difficult to avoid generation of fluctuations in the shape of the particles, so that the variation coefficient of the shape factor and the variation coefficient of the particle diameter are inevitably increased to high values. However, in the case of this application, by adopting the non-spherical shape that is closer to a spherical shape than the shape that is conventionally supposed to be favorable, it is possible to set the variation coefficient of the shape factor and the variation coefficient of the particle diameter to be within the respective ranges which can attain a desired effect.

The lower limit of the number mean particle diameter of the non-electroconductive particles is preferably 100 nm or more, whereas the upper limit thereof is preferably 1000 nm or less. By setting the number mean particle diameter of the non-electroconductive particles to be within such a range, the non-electroconductive particles can have the portions for contacting with each other and can form the gap between the non-electroconductive particles to such an extent that movement of ions is not inhibited. Therefore, it is preferable that the mean particle diameter of the non-electroconductive particles is within the aforementioned range because thereby the strength of the porous membrane is improved and the short circuit of the battery can be prevented as well.

As for more preferable range of the number mean particle diameter, the lower limit is preferably 200 nm or more, and more preferably 300 nm or more. On the other hand, the upper limit is preferably 800 nm or less, and more preferably 700 nm or less.

In the present invention, the mean particle diameter may be the mean value of the particle diameters obtained by measuring 100 particles with the electron microscope photograph (magnification of 25,000 times).

By setting the mean particle diameter of the non-electroconductive particles to be within the aforementioned range, the non-electroconductive particles can have the portions for contacting with each other and can form the gap between the non-electroconductive particles to such an extent that movement of ions is not inhibited, in a range of the thickness (3 to 10 μm) that is preferable as the porous membrane of a secondary battery. Therefore, as long as the mean particle diameter of the non-electroconductive particles is within the aforementioned range, any mean particle diameter allows uniform thickness of the obtained porous membrane, thereby contributing to improvement in the strength of the porous membrane, prevention of the short circuit of the battery, and improvement in cycle property of the battery.

A too large mean particle diameter may result in less contact portions between the non-electroconductive particles and non-uniform thickness in the range of the thickness (3 to 10 μm) that is preferable as the porous membrane of a secondary battery. Therefore such a too large mean particle diameter may result in insufficient porous membrane strength and tendency to cause short circuit of the battery, and is thus not preferable. On the other hand, a too small mean particle diameter may give small gap between the non-electroconductive particles, so that movement of ions is inhibited and the cycle property of the battery may be deteriorated, and is thus not preferable.

The non-electroconductive particles of which the arithmetic mean value of the shape factor, the variation coefficient of the shape factor, and the variation coefficient of the particle diameter are within the aforementioned range may be manufactured by appropriately adjusting the conditions in the method for manufacturing the non-electroconductive particles which will be described later. In particular, by controlling the composition and the molecular weight of seed particles, these values can be adjusted in desired ranges.

[Materials of Non-Electroconductive Particles]

In the present invention, the non-electroconductive particles are particles of a polymer. Such a polymer may be obtained by polymerizing a polymerizable monomer composition to be in a shape of particles. The monomer constituting the polymerizable monomer composition may be appropriately selected so that desired properties can be obtained. A preferable monomer composition is those containing the monomers described below.

[Polar Group-Containing Monomer]

The polymerizable monomer composition preferably contains a polar group-containing monomer. The polar group-containing monomer is a monomer which contains a polar group in its molecular structure and capable of being copolymerized with one or more species of other monomers in the polymerizable monomer composition, especially with divinylbenzene and ethylvinylbenzene. The polar group refers to a functional group which is capable of dissociating in water or a functional group which has polarization, and specific examples of the polar group may include a carboxyl group, a sulfonic acid group, a hydroxyl group, an amido group, a cationic group, a cyano group, and an epoxy group.

Examples of the polar group-containing monomer may include a monomer containing a carboxyl group, a monomer containing a sulfonic acid group, a monomer containing a hydroxyl group, a monomer containing an amido group, a cationic monomer, a monomer containing a cyano group, a monomer containing an epoxy group, and salts thereof.

Examples of the monomer containing a carboxyl group may include monocarboxylic acid, dicarboxylic acid, anhydrides of dicarboxylic acid, and derivatives thereof.

Examples of monocarboxylic acid may include acrylic acid, methacrylic acid, crotonic acid, 2-ethylacrylic acid, isocrotonic acid, α-acetoxy acrylic acid, β-trans-aryloxy acrylic acid, α-chloro-β-E-methoxy acrylic acid, and β-diaminoacrylic acid.

Examples of dicarboxylic acid may include maleic acid, fumaric acid, itaconic acid, methylmaleic acid, dimethylmaleic acid, phenylmaleic acid, chloromaleic acid, dichloromaleic acid, and fluoromaleic acid.

Examples of the dicarboxylic acid derivative may include maleate esters such as methylallyl maleate, diphenyl maleate, nonyl maleate, decyl maleate, dodecyl maleate, octadecyl maleate, and fluoroalkyl maleate.

Examples of the acid anhydride of dicarboxylic acid may include a maleic anhydride, an acrylic acid anhydride, a methyl maleic anhydride, and a dimethyl maleic anhydride.

Examples of the monomer containing a sulfonic acid group may include vinylsulfonic acid, methylvinylsulfonic acid, (meth)allylsulfonic acid, styrenesulfonic acid, (meth) acrylic acid-2-ethyl sulfonate, 2-acrylamide-2-methylpropanesulfonic acid, and 3-allyloxy-2-hydroxypropanesulfonic acid.

Examples of the monomer containing a hydroxyl group may include ethylenically unsaturated alcohols such as (meth)allyl alcohol, 3-buten-1-ol, and 5-hexen-1-ol; alkanol esters of ethylenically unsaturated carboxylic acid such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of polyalkylene glycol and (meth)acrylic acid represented by a general formula of $CH_2=CR^1-COO-(CnH_2nO)m-H$ (m represents an integer of 2 to 9, n represents an integer of 2 to 4, and $R^1$ represents hydrogen or a methyl group); mono(meth)acrylate esters of dihydroxy ester of dicarboxylic acid such as 2-hydroxyethyl-2'-(meth)acryloyloxy phthalate, and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycol such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of a halogenated or hydroxylated product of (poly) alkylene glycol such as glycerol mono(meth)allyl ether, (meth)allyl-2-chloro-3-hydroxypropyl ether, and (meth)allyl-2-hydroxy-3-chloropropyl ether; mono(meth)allyl ethers of polyhydric phenol such as eugenol and isoeugenol and halogenated products thereof; and (meth)allyl thioethers of alkylene glycol such as (meth)allyl-2-hydroxyethyl thioether and (meth)allyl-2-hydroxypropyl thioether.

Examples of the monomer containing an amido group may include acrylamide, methacrylamide, N-methylolacrylamide, and N-methylolmethacrylamide.

Examples of the cationic monomer may include dimethylaminoethyl(meth)acrylate and dimethylaminopropyl (meth)acrylate.

Examples of the monomer containing a cyano group may include vinyl cyanide compounds such as acrylonitrile and methacrylonitrile.

Examples of the monomer containing an epoxy group may include glycidyl acrylate and glycidyl methacrylate.

Examples of the salts of the monomer containing a carboxyl group, the monomer containing a sulfonic acid group, the monomer containing a hydroxyl group, the monomer containing an amido group, the cationic monomer, and the monomer containing a cyano group may include alkali metal salts such as sodium salts and potassium salts, alkaline earth metal salts such as calcium salts and magnesium salts, organic amine salts such as ammonium salts, monoethanolamine salts, and triethanolamine salts, comprising the monomers listed above and suitable ions to be combined therewith.

The polar group-containing monomer is preferably the monomer containing a carboxyl group or the monomer containing an amido group, and particularly preferably acrylic acid, methacrylic acid, itaconic acid, or acrylamide.

[Divinylbenzene and Ethylvinylbenzene]

The polymerizable monomer composition preferably contains divinylbenzene and ethylvinylbenzene. As divinylbenzene and ethylvinylbenzene constituting the polymerizable monomer composition, any isomers (ortho-, meta-, para-isomers) may be used, and a mixture of a plurality of isomers may also be used.

Divinylbenzene and ethylvinylbenzene are commercially available as a preparation of a mixture with a specific ratio, and these may be obtained at lower cost than purified divinylbenzene alone or ethylvinylbenzene alone. In the present invention, the monomer composition containing both divinylbenzene and ethylvinylbenzene is used, so that a manufacturing cost can be reduced by utilizing such an inexpensive preparation product as a material.

[Optional Monomer]

In addition to the aforementioned three species of monomers, if necessary, the polymerizable monomer composition may contain an optional monomer. Examples of such an optional monomer may include a monomer which does not contains a polar group, is a monomer other than divinylbenzene and ethylvinylbenzene, and may copolymerize with the polar group-containing monomer, divinylbenzene, and ethylvinylbenzene.

Specific examples of the optional monomer may include the crosslikable monomers and the non-crosslinkable monomers described below.

Examples of the crosslikable monomer as the optional monomer may include a diacrylate compound, a triacrylate compound, a tetraacrylate compound, a dimethacrylate compound, and a trimethacrylate compound.

Examples of the diacrylate compound may include polyethylene glycol diacrylate, 1,3-butylene glycol diacrylate, 1,6-hexaneglycol diacrylate, neopentyl glycol diacrylate, polypropylene glycol diacrylate, 2,2'-bis(4-acryloxypropyloxyphenyl)propane, and 2,2'-bis(4-acryloxydiethoxyphenyl)propane.

Examples of the triacrylate compound may include trimethylolpropane triacrylate, trimethylolethane triacrylate, and tetramethylolmethane triacrylate.

Examples of the tetraacrylate compound may include tetramethylolmethane tetraacrylate.

Examples of the dimethacrylate compound may include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane glycol dimethacrylate, neopentyl glycol dimethacrylate, dipropylene glycol dimethacrylate, polypropylene glycol dimethacrylate, and 2,2'-bis(4-methacryloxydiethoxyphenyl)propane.

Examples of the trimethacrylate compound may include trimethylolpropane trimethacrylate and trimethylolethane trimethacrylate.

Examples of the non-crosslinkable monomer as an optional monomer may include aromatic monovinyl compounds such as styrene, α-methylstyrene, fluorostyrene, and vinylpyridine; acrylate ester monomers such as methyl acrylate, butyl acrylate, and 2-ethylhexylethyl acrylate; methacrylate ester monomers such as methyl methacrylate, butyl methacrylate, and 2-ethylhexyl methacrylate; conjugated double bond compounds such as butadiene and isoprene; vinyl ester compounds such as vinyl acetate; and α-olefin compounds such as 4-methyl-1-pentene.

As the aforementioned optional monomers, any one species thereof may be used alone, or two or more species thereof may be used in combination. Among the aforementioned optional monomers, particularly, styrene, methyl methacrylate, or a combination thereof is preferable in terms of good reactivity with divinylbenzene and ethylvinylbenzene.

[Ratio of Monomers]

The polymerizable monomer composition preferably includes 0.05% to 4% by weight of the polar group-containing monomer, 20% to 80% by weight of divinylbenzene, and 3.2% to 48% by weight of ethylvinylbenzene as the ratios relative to the total weight of the monomers. The total weight of the monomers herein refers to the total weight of the polar group-containing monomer, divinylbenzene, and ethylvinylbenzene, as well as the optional monomer other than these if present.

When the ratio of the polar group-containing monomer is more than the aforementioned upper limit, the water content on the surface of the non-electroconductive particle surface is increased, which leads to deterioration of battery property, and decrease in the adhesiveness between the non-electroconductive particles and the binder for a porous membrane, thus not being preferable. On the other hand, when the ratio of the polar group-containing monomer is less than the aforementioned lower limit, the dispersibility of the non-electroconductive particles is deteriorated, which leads to decreasing the strength of the porous membrane and deteriorating the membrane uniformity, thus not being preferable.

When the ratio of divinylbenzene is more than the aforementioned upper limit, the crosslinking density of the non-electroconductive particles is excessively increased so that the adhesiveness between the non-electroconductive particles and the binder for a porous membrane is deteriorated and the strength of the porous membrane is decreased, which may cause high tendency of generating the short circuit of the battery, thus not being preferable. On the other hand, when the ratio of divinylbenzene is less than the aforementioned lower limit, the thermal resistance of the non-electroconductive particles is deteriorated so that the thermal resistance of the porous membrane is deteriorated, which may cause high tendency of generating the short circuit of the battery, thus not being preferable.

When the ratio of ethylvinylbenzene is more than the aforementioned upper limit, the thermal resistance of the non-electroconductive particles is deteriorated due to the plasticizing effect of ethylvinylbenzene to deteriorate the thermal resistance of the porous membrane, which may cause high tendency of generating the short circuit of the battery, thus not being preferable. In addition, the non-electroconductive particles are fused with each other when a charging and discharging cycle is repeated at high temperatures. Such fusion decreases the void ratio of the porous membrane and therefore deteriorates cycle property, thus not being preferable. On the other hand, when the ratio of ethylvinylbenzene is less than the aforementioned lower limit, the crosslinking density of the non-electroconductive particles is excessively increased so that the adhesiveness between the non-electroconductive particles and the binder for a porous membrane is deteriorated and the strength of the porous membrane is decreased, which may cause high tendency of generating the short circuit of the battery, thus not being preferable.

As for the range of more preferable content ratio of the polar group-containing monomer in 100 parts by weight of the polymerizable monomer composition, the lower limit is preferably 0.1 parts by weight or more, and more preferably 0.2 parts by weight or more. On the other hand, the upper limit is preferably 3 parts by weight or less, and more preferably 2 parts by weight or less.

As for the range of more preferable content ratio of divinylbenzene in 100 parts by weight of the polymerizable monomer composition, the lower limit is preferably 25 parts by weight or more, and more preferably 30 parts by weight or more. On the other hand, the upper limit is preferably 70 parts by weight or less, and more preferably 60 parts by weight or less.

As for the range of more preferable content ratio of ethylvinylbenzene in 100 parts by weight of the polymerizable monomer composition, the lower limit is preferably 3.2 parts by weight or more, and more preferably 10 parts by weight or more. On the other hand, the upper limit is preferably 48 parts by weight or less, and more preferably 40 parts by weight or less.

The ratio of the containing amount of divinylbenzene to ethylvinylbenzene (divinylbenzene/ethylvinylbenzene) which are contained in the polymerizable monomer composition is preferably 1.0 to 5.25. When the ratio of the containing amount is more than the aforementioned upper limit, the crosslinking density of the non-electroconductive particles is excessively increased, and the adhesiveness between the non-electroconductive particles and the binder for a porous membrane is thereby deteriorated, to cause decrease in strength of the porous membrane, which may cause high tendency of generating the short circuit of the battery, thus not being preferable. On the other hand, when the ratio of the containing amount is less than the aforementioned lower limit, the thermal resistance of the non-electroconductive particles is deteriorated due to the plasticizing effect of ethylvinylbenzene, to deteriorate the thermal resistance of the porous membrane, which may cause high tendency of generating the short circuit of the battery, thus not being preferable. In addition, such a low ratio is not preferable also because the non-electroconductive particles are fused with each other when a charging and discharging cycle is repeated at high temperatures, thereby decreasing the void ratio of the porous membrane and deteriorating cycle property.

The lower limit of the ratio of the containing amount of divinylbenzene to ethylvinylbenzene is more preferably 1.25 or more. On the other hand, the upper limit is more preferably 4.75 or less.

When the polymerizable monomer composition contains optional ingredient monomers other than the aforementioned three species of monomers (i.e., the polar group-containing monomer, divinylbenzene, and ethylvinylbenzene) which are preferably contained, the amount of the optional monomers may be appropriately determined as the remainder. In particular, when styrene and/or methyl methacrylate are contained as optional ingredient monomers, the preferable content ratio thereof is 4.5% to 76.5% by weight based on the total amount of the monomers in the polymerizable monomer composition. When both styrene and methyl methacrylate are contained, the total thereof is preferably within this range. By setting the ratio of styrene and/methyl methacrylate to the aforementioned upper limit or less, the dispersibility of the particles is prevented from being deteriorated, so that the strength of the porous membrane can be increased and the membrane uniformity can be attained. On the other hand, by setting the ratio of styrene and/methyl methacrylate to the aforementioned lower limit or more, the thermal resistance of the non-electroconductive particles can be improved, so that the thermal resistance of the porous membrane can be improved, which lead to reduction in generation of the short circuit of the battery at high temperatures.

[Method for Manufacturing Non-Electroconductive Particles]

The method for polymerizing the polymerizable monomer composition to obtain the non-electroconductive particles is not particularly limited, but preferable examples thereof may include a method wherein the polymerizable monomer composition and, if necessary, other optional ingredients are dissolving or dispersing in a dispersion medium, and polymerized in the dispersion liquid.

In emulsion polymerization, it is preferable that polymerization is carried out in a divided manner in a plurality of stages for obtaining a desired shape. For example, a part of the monomer constituting the polymerizable monomer composition is polymerized in advance to form a seed polymer, and subsequently another monomer is adsorbed to the seed polymer, followed by polymerization keeping that state, to manufacture the non-electroconductive particles. Moreover, in forming the seed polymer, polymerization may be further divided into a plurality of stages to be carried out.

More specifically, a part of the monomer constituting the polymerizable monomer composition may be used for forming seed polymer A, and then the seed polymer A and another monomer constituting the polymerizable monomer composition may be used for forming larger seed polymer B, and then the seed polymer B and the remainder of the monomer constituting the polymerizable monomer composition may be used for forming the non-electroconductive particles. By forming the seed polymer in two stages of the reaction and further forming the non-electroconductive particles therewith in this manner, it is possible to enjoy an advantage in that the polymer particles having a desired particle diameter and shape factor can be stably obtained.

In this case, it is preferable that a part or all (preferably all) of the polar group-containing monomer in the polymerizable monomer composition is used in forming of the seed polymer for ensuring the stability of the particles. Moreover, styrene which is an optional ingredient monomer is preferably used as a monomer for forming the seed polymer for ensuring the seed polymer's ability to absorb the monomer.

Accordingly, since the polymerization may be carried out in a divided manner in a plurality of stages, the polymerizable monomer composition upon polymerization does not have to be in the state of a mixture of all components of the monomers. When polymerization is carried out in a divided manner in a plurality of stages, it is preferable that the composition of the monomers from which the polymerization units constituting the finally obtained non-electroconductive particles are derived is in the aforementioned preferable range.

Examples of the medium to be used for polymerization of the polymerizable monomer composition may include water, an organic solvent, and mixtures thereof. As the organic solvent, one which is inactive for radical polymerization and does not inhibit polymerization of the monomer may be used. Specific examples of the organic solvent may include alcohols such as methanol, ethanol, propanol, cyclohexanol, and octanol; esters such as dibutyl phtalate and dioctyl phthalate; ketones such as cyclohexanone; and mixtures thereof. Preferably, aqueous medium such as water is used as a dispersion medium, and emulsion polymerization is performed as polymerization.

As for the quantitative ratio of the seed polymer and the monomer in performing their reaction, the ratio of the monomer with respect to 1 part by weight of the seed polymer particles is preferably 2 to 19 parts by weight, more preferably 3 to 16 parts by weight, and still more preferably 4 to 12 parts by weight. By setting the using amount of the monomer to 2 parts by weight or more, the mechanical strength and the thermal resistance of the obtained particles can be increased. By setting the using amount of the monomer to 19 parts by weight or less, the quantitative ratio results in the range such that the seed polymer particles has a sufficient capacity to absorb the monomer, whereby the monomer which is not absorbed by the seed polymer particles can be kept in a range of small amount and the particle diameter can be controlled in a favorable manner to prevent generation of coarse particles and a large amount of fine particles which cause wide particle diameter distribution.

Specific examples of the polymerization procedure may include a method wherein the monomer is poured at a time in an aqueous dispersion of the seed polymer particles, and a method wherein the monomer is added in a divided or continuous manner during performing polymerization. It is preferable to allow the seed polymer particles to absorb the monomer before crosslinking is substantially taken place as a result of initiation of polymerization in the seed polymer particles.

When the monomer is added after the middle stage of polymerization, the monomer is not absorbed by the seed polymer particles, so that a large amount of fine particles are generated to deteriorate polymerization stability and a polymerization reaction may not be maintained. Accordingly, it is preferable that all of the monomer is added to the seed polymer particles before polymerization is initiated or all of the monomer is completely added before the polymerization conversion rate reaches about 30%. It is particularly preferable that the monomer is added to the aqueous dispersion of the seed polymer particles and stirred before polymerization is initiated to allow the seed polymer to absorb the monomer, and thereafter polymerization is initiated.

In addition to the polymerizable monomer composition and the medium, the reaction system for polymerization may contain an optional ingredient. Specifically, ingredients such as a polymerization initiator, a chain transfer agent, a suspension protective agent, and a surfactant may be added. As the polymerization initiator, a general water-soluble radical polymerization initiator or an oil-soluble radical polymerization initiator may be used, but it is preferable to use the water-soluble polymerization initiator because the monomer which is not absorbed by the seed polymer particles hardly initiates polymerization in an aqueous phase. Examples of the water-soluble radical initiator may include potassium persulfate, sodium persulfate, cumene hydroperoxide, hydrogen peroxide, and redox initiators that are combinations of these reducing agents. Examples of the oil-soluble polymerization initiator may include benzoyl peroxide, α,α'-azobisisobutyronitrile, t-butylperoxy-2-ethylhexanoate, and 3,5,5-trimethylhexanoyl peroxide. Among the oil-soluble polymerization initiators, t-butylperoxy-2-ethylhexanoate may be preferably used. It is preferable to add a small amount of water-soluble polymerization inhibitor such as potassium dichromate, ferric chloride, and hydroquinone in the polymerization reaction because thereby generation of fine particles can be suppressed.

For the purpose of adjusting the molecular weight of the resin, a chain transfer agent which is generally used may be used. Examples of the chain transfer agent for use may include, but are not limited to, mercaptan such as octylmercaptan, dodecyl mercaptan, and tert-dodecyl mercaptan; n-octyl-3-mercaptopropionic acid ester, terpinolene, carbon tetrabromide, and α-methylstyrene dimer.

As a surfactant, ordinary one may be used, and examples thereof may include anionic emulsifiers such as sodium dodecylbenzenesulfonate, sodium laurylsulfate, sodium dialkylsulfosuccinate, and a naphthalenesulfonic acid-formalin condensate. Furthermore, nonionic surfactants such as polyoxyethylene nonylphenyl ether, polyethylene glycol monostearate, and sorbitan monostearate may be used in combination. Examples of a preferable suspension protective agent may include polyvinyl alcohol, carboxylmethyl cellulose, sodium polyacrylate, and fine powders of inorganic compounds.

In the present invention, as for the most preferable combination of the polymerization initiator and a stabilizer for obtaining the non-electroconductive particles having a target particle diameter and narrow particle diameter distribution with being reproducibly controlled while ensuring the stability of the system during polymerization, the water soluble polymerization initiator is used as a polymerization initiator, and a surfactant is used as the stabilizer at a concentration that is not more than the C.M.C. concentration and is near the C.M.C. concentration (specifically, 0.3 to 1.0 times the C.M.C. concentration) in the polymerization system.

By polymerizing the polymerizable monomer composition in an ordinary method such as the aforementioned method to manufacture the non-electroconductive particles, the non-conducting particles substantially consisting of the polymer having the polymerization unit based on the monomers constituting the polymerization monomer composition (the polar group-containing monomer, divinylbenzene, ethylvinylbenzene, and other optional monomers) may be obtained. Usually, the ratio of the polymerization unit in the polymer constituting the non-electroconductive particles is approximately in accordance with the ratio of the monomer in the polymerizable monomer composition. That is, in the non-electroconductive particles, the ratio of each of the polymerization unit based on the polar group-containing monomer, the polymerization unit based on divinylbenzene, the polymerization unit based on ethylvinylbenzene, and the polymerization unit based on other optional monomers is approximately in accordance with the ratio of each of the polar group-containing monomer, divinylbenzene, ethylvinylbenzene, and other optional monomers in the polymerizable monomer composition.

[T10 Value of Non-Electroconductive Particles]

As for the non-electroconductive particles used in the present invention, the temperature at which the ratio of reduced amount of the non-electroconductive particles reaches 10% by weight when heated in a thermobalance at a heating rate of 10° C./minute under a nitrogen atmosphere (this temperature is referred to hereinbelow as a T10 value) is preferably 360° C. or more. By setting the T10 value of the non-electroconductive particles in this range, the thermal resistance of the porous membrane is improved and the ability to prevent the short circuit at high temperatures is further improved. The upper limit of the T10 value is not particularly limited, but may be 700° C. or less.

[Content Ratio of Non-Electroconductive Particles in Porous Membrane]

As for the range of the content ratio of the non-electroconductive particles based on the total weight of the porous membrane for a secondary battery of the present invention, the lower limit is preferably 70% by weight or more, and more preferably 80% by weight or more. On the other hand, the upper limit is preferably 97% by weight or less, and more preferably 95% by weight or less. By setting the content ratio of the non-electroconductive particles of the porous membrane for a secondary battery within this range, the non-electroconductive particles can have portions for contacting with each other and can form the gap between the non-electroconductive particles to such an extent that movement of ions is not inhibited. Therefore, it is preferable that the mean particle diameter of the non-electroconductive particles is within the aforementioned range because thereby the strength of the porous membrane is improved and the short circuit of the battery can be prevented as well.

[Binder for Porous Membrane]

The porous membrane for a secondary battery of the present invention includes the binder for a porous membrane.

As the binder for a porous membrane used in the present invention, a variety of binders may be used as long as the binders have a binding property. Examples of the binder may include a diene polymer, a (meth)acrylic polymer, a fluorine polymer, and a silicon polymer. Especially, the (meth)acrylic polymer is preferable because it brings about excellent retentivity of the non-electroconductive particles and flexibility of the resulting porous membrane and it facilitates production of the battery which is stable in oxidation and reduction and has excellent life property. The (meth)acrylic polymer may be particularly preferably used in the present invention because the aforementioned property is particularly excellent in the porous membrane in which not inorganic particles such as alumina but organic polymer particles are used as the non-electroconductive particles.

The (meth)acrylic polymer is a polymer including the polymerization unit of an acrylate ester and/or methacrylate ester monomer. In this application, the "(meth)acrylic" means acrylic and/or methacrylic and the "(meth)acrylate" means acrylate and/or methacrylate.

Examples of the acrylate ester and/or methacrylate ester monomer may include alkyl acrylates such as methyl acrylate, ethyl acrylate, n-propylacrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Among them, heptyl acrylate, octyl acrylate, 2-ethylhexyl acrylate, nonyl acrylate, decyl acrylate, and lauryl acrylate, which are alkyl acrylates having an alkyl group having 7 to 13 carbon atoms bonded to a non-carbonyl oxygen atom, are preferable because they show lithium ion conductivity due to moderate swelling in an electrolytic solution without being eluted to the electrolytic solution and have low tendency to cause polymer crosslinking flocculation in dispersion of an active material. Octyl acrylate, 2-ethylhexyl acrylate, and nonyl acrylate, which have an alkyl group having 8 to 10 carbon atoms bonded to a non-carbonyl oxygen atom are more preferable.

The content ratio of the polymerization unit of the (meth)acrylate ester monomer in the (meth)acrylic polymer is preferably 50% to 98% by weight, more preferably 60% to 97.5% by weight, and particularly preferably 70% to 95% by weight.

The (meth)acrylic polymer may preferably include an optional polymerization unit of another monomer in addition to the polymerization unit of the (meth)acrylate ester monomer.

Examples of the optional polymerization unit of a monomer may include a polymerization unit of a vinyl monomer having an acidic group, a polymerization unit of an $\alpha,\beta$-unsaturated nitrile monomer, and a polymerization unit of a monomer having a crosslinkable group.

Examples of the vinyl monomer having an acidic group may include a monomer having a —COOH group (carboxylic acid group), a monomer having an —OH group (hydroxyl group), a monomer having a —SO$_3$H group (sulfonic acid group), a monomer having a —PO$_3$H$_2$ group, a monomer having a —PO(OH)(OR) group (R represents a hydrocarbon group), and a monomer having a lower polyoxyalkylene group. In addition, an acid anhydride which generates a carboxylic acid group through hydrolysis may be similarly used.

Examples of the monomer having a carboxylic acid group may include monocarboxylic acid, dicarboxylic acid, anhydrides of dicarboxylic acid, and derivatives thereof. Examples of monocarboxylic acid may include acrylic acid, methacrylic acid, crotonic acid, 2-ethylacrylic acid, isocrotonic acid, α-acetoxy acrylic acid, β-trans-aryloxy acrylic acid, α-chloro-β-E-methoxy acrylic acid, and β-diaminoacrylic acid. Examples of dicarboxylic acid may include maleic acid, fumaric acid, itaconic acid, methylmaleic acid, dimethylmaleic acid, phenylmaleic acid, chloromaleic acid, dichloromaleic acid, and fluoromaleic acid, and maleate esters such as methylallyl maleate, diphenyl maleate, nonyl maleate, decyl maleate, dodecyl maleate, octadecyl maleate, and fluoro alkyl maleate. Examples of the acid anhydride of dicarboxylic acid may include a maleic anhydride, an acrylic acid anhydride, a methylmaleic anhydride, and a dimethylmaleic anhydride.

Examples of the monomer having a hydroxy group may include ethylenically unsaturated alcohols such as (meth)allyl alcohol, 3-buten-1-ol, and 5-hexen-1-ol; alkanol esters of ethylenically unsaturated carboxylic acid such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of polyalkylene glycol and (meth)acrylic acid represented by a general formula of $CH_2=CR^1$—COO—$(CnH_2nO)$ m-H (m represents an integer of 2 to 9, n represents an integer of 2 to 4, and $R^1$ represents hydrogen or a methyl group); mono(meth)acrylate esters of dihydroxy ester of dicarboxylic acid such as 2-hydroxyethyl-2'-(meth)acryloyloxy phthalate, and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycol such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of a halogenated or hydroxylated product of (poly)alkylene glycol such as glycerol mono(meth)allyl ether, (meth)allyl-2-chloro-3-hydroxypropyl ether, and (meth)allyl-2-hydroxy-3-chloropropyl ether; mono(meth)allyl ethers of polyhydric phenol such as eugenol and isoeugenol and halogenated products thereof; and (meth)allylthioethers of alkylene glycol such as (meth)allyl-2-hydroxyethyl thioether and (meth)allyl-2-hydroxypropyl thioether.

Examples of the monomer having a sulfonic acid group may include vinylsulfonic acid; methylvinylsulfonic acid, (meth)allylsulfonic acid, styrenesulfonic acid, (meth)acrylic acid-2-ethyl sulfonate, 2-acrylamide-2-methylpropanesulfonic acid, and 3-allyloxy-2-hydroxypropanesulfonic acid.

Examples of the monomer having a —PO$_3$H$_2$ group and/or a —PO(OH)(OR) group (R represents a hydrocarbon group) may include 2-(meth)acryloyloxyethyl phosphate, methyl-2-(meth)acryloyloxyethyl phosphate, and ethyl-(meth) acryloyloxyethyl phosphate.

Examples of the monomer having a lower polyoxyalkylene group may include poly(alkylene oxide) such as polyethylene oxide).

Among them, the monomer having a carboxylic acid group is preferable because it has excellent adhesion to an electrode mixed material layer or an organic separator layer which will be described below and it efficiently scavenges transition metal ions eluted from a positive electrode active material. Especially preferable are monocarboxylic acids of 5 or less carbon atoms having a carboxylic acid group such as acrylic acid and methacrylic acid, and dicarboxylic acids of 5 or less carbon atoms having two carboxylic acid groups per molecule such as maleic acid and itaconic acid. Furthermore, acrylic acid, methacrylic acid, and itaconic acid are preferable in view of high preservation stability of the produced slurry.

The content ratio of the polymerization unit of the vinyl monomer having an acidic group in the binder for a porous membrane is preferably 1.0% to 3.0% by weight, and more preferably 1.5% to 2.5% by weight.

Examples of the α,β-unsaturated nitrile monomer may include acrylonitrile, methacrylonitrile, α-chloroacrylonitrile, α-ethylacrylonitrile, and mixtures thereof. Among them, acrylonitrile and methacrylonitrile are preferable in view of improvement in mechanical strength of the porous membrane and binding capacity in the porous membrane.

The content ratio of the polymerization unit of the α,β-unsaturated nitrile monomer in the binder for a porous membrane is preferably 1.0% to 50% by weight, more preferably 1.0% to 40% by weight, and particularly preferably 1.0% to 30% by weight.

Examples of the monomer having a crosslinkable group may include a monofunctional monomer having a crosslinkable group and one olefinic double bond per molecule and a polyfunctional monomer having two or more olefinic double bonds per molecule.

As the crosslinkable group included in the monofunctional monomer having a crosslinkable group and one olefinic double bond per molecule, at least one species selected from the group consisting of an epoxy group, an N-methylolamido group, an oxetanyl group, and an oxazoline group is preferable. An epoxy group is more preferable since thereby crosslinking and crosslinking density can be easily adjusted.

Examples of the monomer containing an epoxy group, which is included in the monomer having a crosslinkable group, may include a monomer containing a carbon-carbon double bond and an epoxy group and a monomer containing a halogen atom and an epoxy group.

Examples of the monomer containing a carbon-carbon double bond and an epoxy group may include unsaturated glycidyl ethers such as vinyl glycidyl ether, allyl glycidyl ether, butenyl glycidyl ether, and o-allyl phenyl glycidyl ether; monoepoxides of diene or polyene such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acid such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of the monomer having a halogen atom and an epoxy group may include epihalohydrins such as epichlorohydrin, epibromohydrin, epiiodohydrin, epifluorohydrin, and β-methyl epichlorohydrin; p-chlorostyrene oxide; and dibromophenyl glycidyl ether.

Examples of the monomer containing an N-methylol amido group may include (meth)acrylamides having a methylol group, such as N-methylol(meth)acrylamide.

Examples of the monomer containing an oxetanyl group may include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

Examples of the monomer containing an oxazoline group may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Preferable examples of the polyfunctional monomer having two or more olefinic double bonds per molecule may include allyl acrylate or allyl methacrylate, trimethylolpropane-triacrylate, trimethylolpropane-methacrylate, dipropylene glycol diallyl ether, polyglycol diallyl ether, triethylene glycol divinyl ether, hydroquinone diallyl ether, tetra allyloxy ethane, other allyl or vinyl ether of polyfunctional alcohol, tetraethylene glycol diacrylate, triallylamine, trimethylolpropane-diallyl ether, methylenebisacrylamide, and/or divinylbenzene. Particular examples may be allyl acrylate, allyl methacrylate, trimethylolpropane-triacrylate, and/or trimethylolpropane-methacrylate.

Among them, the polyfunctional monomer having two or more olefinic double bonds per molecule is preferable because therewith crosslinking density can be easily improved. Especially, acrylate or methacrylate having an allyl group, such as allyl acrylate or allyl methacrylate, is preferable in view of crosslinking density improvement and its high copolymerization property.

The content ratio of the polymerization unit of the monomer having a crosslinkable group in the binder for a porous membrane is in the range of preferably 0.01% to 2.0% by weight, more preferably 0.05% to 1.5% by weight, and particularly preferably 0.1% to 1.0% by weight. By setting the content ratio of the polymerization unit of the monomer having a crosslinkable group in the binder for a porous membrane in the aforementioned range, elution to an electrolytic solution can be suppressed because of the aforementioned range, and excellent porous membrane strength and long-term cycle property can be obtained.

In addition to the polymerization units based on the aforementioned monomers, the binder for a porous membrane used in the present invention may also include a polymerization unit based on a monomer copolymerizable therewith. Examples of the monomer copolymerizable therewith may include halogen atom-containing monomers such as vinyl chloride and vinylidene chloride; vinyl esters such as vinyl acetate, vinyl propionate, and vinyl butyrate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; heterocycle-containing vinyl compounds such as N-vinylpyrrolidone, vinylpyridine, and vinylimidazole; and acrylamide. These monomers are subjected to graft copolymerization by a proper technique to obtain the binder having the aforementioned constitution.

As for the range of the content ratio of the binder for a porous membrane on the basis of the total weight of the porous membrane for a secondary battery of the present invention, the lower limit thereof is preferably 3% by weight or more, and more preferably 5% by weight or more. On the other hand, the upper limit is preferably 20% by weight or less, and more preferably 15% by weight or less. When the content ratio of the binder for a porous membrane in the porous membrane for a secondary battery is the aforementioned lower limit or less, the strength of the porous membrane may become insufficient and the short circuit of the battery may be easily generated. When the content ratio of the binder for a porous membrane in the porous membrane for a secondary battery is the aforementioned upper limit or more, the void ratio of the porous membrane may be decreased and sufficient battery performance may not be obtained.

In the porous membrane for a secondary battery of the present invention, the ratio of the content of the non-electroconductive particles and the content of the binder for a porous membrane is preferably within the range of 5 to 30 as the ratio of (the weight of the non-electroconductive particles)/(the weight of the binder for a porous membrane). By setting the ratio in this range, both resistance to short circuit at high temperatures and excellent cycle property can be maintained.

The binder for a porous membrane used in the present invention is usually dispersed in a dispersion medium (water or an organic solvent) to be prepared and preserved as a dispersion liquid, and this dispersion liquid is used as a material for manufacturing a slurry for a porous membrane. In the present invention, water is preferably used as a dispersion medium in view of less environmental load and a rapid drying rate. When an organic solvent is used as a dispersion medium, an organic solvent such as N-methyl-pyrrolidone (NMP) is used.

When the binder for a porous membrane is dispersed in a particle form in the dispersion medium, the number mean particle diameter (dispersed particle diameter) of the binder dispersed in a particle form is preferably 50 to 500 nm, more preferably 70 to 400 nm, and most preferably 100 to 250 nm. When the number mean particle diameter of the binder for a porous membrane is in this range, good strength and flexibility of the resulting porous membrane can be achieved.

When the binder for a porous membrane is dispersed in a particle form in the dispersion medium, the solid content concentration thereof in the dispersion liquid is usually 15% to 70% by weight, preferably 20% to 65% by weight, and more preferably 30% to 60% by weight. When the solid content concentration is in this range, good workability can be achieved in the manufacturing of the slurry for a porous membrane which will be described below.

The glass transition temperature (Tg) of the binder for a porous membrane used in the present invention is preferably −50° C. to 25° C., more preferably −45° C. to 15° C., and particularly preferably −40° C. to 5° C. When the Tg of the binder for a porous membrane is in the aforementioned range, the porous membrane of the present invention has excellent strength and flexibility. As a result, output property of the secondary battery using the porous membrane can be improved. The glass transition temperature of the binder for a porous membrane may be adjusted by combining a variety of monomers.

The method for manufacturing the polymer which is a binder for use in the present invention is not particularly limited, and any methods such as a solution polymerization method, a suspension polymerization method, a bulk polymerization method, and an emulsion polymerization method may be used. As the polymerization reaction, any reactions such as ionic polymerization, radical polymerization, and living radical polymerization may be used. Examples of the polymerization initiator for polymerization may include organic peroxides such as lauroyl peroxide, diisopropyl peroxydicarbonate, di-2-ethylhexyl peroxydicarbonate, t-butyl peroxy pivalate, 3,3,5-trimethyl hexanoyl peroxide; azo compounds such as α,α'-azobisisobutyronitrile; ammonium persulfate, and potassium persulfate.

[Heavy Metal-Scavenging Compound]

The porous membrane for a secondary battery of the present invention preferably includes a heavy metal-scavenging compound in addition to the non-electroconductive particles and the binder for a porous membrane.

When the porous membrane for a secondary battery of the present invention contains the heavy metal-scavenging compound, transition metal ions eluted into the electrolytic solution can be scavenged during charging and discharging of the secondary battery using the porous membrane. Thereby it is possible to prevent deterioration in cycle property and in safety of the secondary battery caused by transition metal ions.

The heavy metal-scavenging compound is not particularly limited as long as the compound has heavy metal-scavenging function, but it is preferably selected from the group consisting of aminocarboxylic acid chelate compounds, phosphonic acid chelate compounds, gluconic acid, citric acid, malic acid, and tartaric acid. Among them, the chelate compounds which can selectively scavenge transition metal ions without scavenging lithium ions are particularly used and the aminocarboxylic acid chelate compounds and phosphonic acid chelate compounds such as those described in the following are particularly preferably used.

The aminocarboxylic acid chelate compound is preferably selected from the group consisting of ethylenediaminetetraacetic acid (which may be referred to hereinbelow as "EDTA"), nitrilotriacetic acid (which may be referred to hereinbelow as "NTA"), trans-1,2-diaminocyclohexane tetraacetic acid (which may be referred to hereinbelow as "DCTA"), diethylene-triaminepentaacetic acid (which may be referred to hereinbelow as "DTPA"), bis-(aminoethyl) glycol ether-N,N,N',N'-tetraacetic acid (which may be referred to hereinbelow as "EGTA"), N-(2-hydroxyethyl) ethylenediamine-N,N',N'-triacetic acid (which may be referred to hereinbelow as "HEDTA"), and dihydroxyethyl glycine (which may be referred to hereinbelow as "DHEG").

As the phosphonic acid chelate compound, 1-hydroxyethane-1,1-diphosphonic acid (which may be referred to hereinbelow as "HEDP") is preferable.

The content of the heavy metal-scavenging compound is preferably 0.001 to 1.0 parts by weight, more preferably 0.005 to 0.5 parts by weight, and particularly preferably 0.01 to 0.3 parts by weight with respect to 100 parts by weight of the binder for a porous membrane (based on the solid content). When the content of the heavy metal-scavenging compound is less than 0.001 parts by weight, scavenging capacity with respect to transition metal ions may become poor so that cycle property of the secondary battery may be deteriorated, thus not being preferable. On the other hand, when the content of the heavy metal-scavenging compound is more than 1.0 part by weight, further improvement in the effect of scavenging transition metals cannot be expected, and cycle property of the secondary battery using the porous membrane of the present invention may be deteriorated, thus not being preferable.

[Other Optional Ingredients of Porous Membrane]

In addition to the aforementioned ingredients, the porous membrane may further include optional ingredients. Examples of such optional ingredients may include a dispersant, a leveling agent, an antioxidant, a binding agent other than the aforementioned binder for a porous membrane, a thickener, a defoaming agent, and an electrolytic solution additive having a function of, e.g., suppressing electrolytic solution decomposition. Such optional ingredients are not particularly limited as long as they do not affect a battery reaction.

Examples of the dispersant may include an anionic compound, a cationic compound, a nonionic compound, and a polymer compound. The dispersant is selected depending on the non-electroconductive particles for use. The content ratio of the dispersant in the porous membrane is preferably in the range which does not affect battery property, and it is specifically 10% by weight or less.

Examples of the leveling agent may include surfactants such as an alkyl surfactant, a silicon surfactant, a fluorosurfactant, and a metal surfactant. When the surfactant is added, possible repelling during coating can be prevented, and smoothness of the electrode can be improved.

Examples of the antioxidant may include a phenol compound, a hydroquinone compound, an organic phosphorus compound, a sulfur compound, a phenylenediamine compound, and a polymer type phenol compound. The polymer type phenol compound is a polymer having a phenol structure in the molecule. It is preferable to use a polymer type phenol compound having a weight mean molecular weight of 200 to 1,000, and preferably 600 to 700.

Examples of the binding agent to be used other than the aforementioned binder for a porous membrane may include polytetrafluoroethylene (PTFE), polyvinylidene fluoride (PVDF), polyacrylic acid derivatives, polyacrylonitrile derivatives, and soft polymers, which are used for the binding agent for the electrode mixed material layer which will be described below.

Examples of the thickener may include cellulose-based polymers such as carboxymethyl cellulose, methyl cellulose, and hydroxypropyl cellulose, and ammonium salts and alkali metal salts thereof; (modified) poly(meth)acrylic acid and ammonium salts and alkali metal salts thereof; polyvinyl alcohols such as (modified) polyvinyl alcohol, a copolymer of acrylic acid or acrylate and vinyl alcohol, and a copolymer of maleic anhydride or maleic acid, or fumaric acid and vinyl alcohol; polyethylene glycol, polyethylene oxide, polyvinylpyrrolidone, modified polyacrylic acid, oxidized starch, starch phosphate, casein, various modified starch, and acrylonitrile-butadiene copolymer hydrides. When the amount of the thickener used is in this range, good coating property and good adhesion to the electrode mixed material layer and the organic separator can be achieved. In the present invention, "(modified) poly" means "unmodified poly" or "modified poly".

Other examples may include nanoparticles such as fumed silica and fumed alumina. By adding the aforementioned nanoparticles, the thixotropy of the slurry for a porous membrane can be controlled and the leveling property of the porous membrane obtained therefrom can be improved.

The content ratio of the aforementioned optional ingredients in the porous membrane is preferably in the range which does not affect battery property. Specifically, the content ratio of each ingredient is 10% by weight or less, and the total content ratio of the optional ingredients is 40% by weight or less, and more preferably 20% by weight or less. However, when the total of the non-electroconductive particles, the aforementioned specific binder for a porous membrane, and the optional ingredients (except for the binding agent other than the binder for a porous membrane) is less than 100% by weight, the content ratio of the binding agent other than the binder for a porous membrane as an optional ingredient can be appropriately increased to obtain the composition.

[Method for Manufacturing Porous Membrane]

Examples of the method for manufacturing the porous membrane of the present invention may include 1) a method wherein the slurry for a porous membrane including the non-electroconductive particles, the binder for a porous membrane, and the medium is applied onto a specific substrate to obtain a slurry layer, and subsequently the slurry layer is dried; and 2) a method wherein the substrate is immersed in the slurry for a porous membrane including the non-electroconductive particles, the binder for a porous membrane, and the medium, and thereafter this is dried. Among them, the method 1) is the most preferable because the thickness of the porous membrane is easily controlled. This method will be described hereinbelow as the method for manufacturing the porous membrane for a secondary battery of the present invention.

[Slurry for Porous Membrane]

The slurry for a porous membrane for use in the manufacturing method of the present invention includes the non-electroconductive particles, the binder for a porous membrane, and the medium. Examples of the non-electroconductive particles and the binder for a porous membrane may include the same ones in the explanation of the porous membrane.

The medium is not particularly limited as long as the aforementioned solid content (the non-electroconductive particles, the binder for a porous membrane, and the aforementioned optional ingredients) can be uniformly dispersed.

As the medium used for the slurry for a porous membrane, both water and an organic solvent may be used. Examples of the organic solvent may include cyclic aliphatic hydrocarbons such as cyclopentane and cyclohexane; aromatic hydrocarbons such as toluene, xylene, and ethylbenzene; ketones such as acetone, ethyl methyl ketone, diisopropyl ketone, cyclohexanone, methylcyclohexane, and ethylcyclohexane; chlorine-based aliphatic hydrocarbons such as methylene chloride, chloroform, and carbon tetrachloride; esters such as ethyl acetate, butyl acetate, γ-butyrolactone, and ε-caprolactone; acylonitriles such as acetonitrile and propionitrile; ethers such as tetrahydrofuran and ethylene glycol diethyl ether; alcohols such as methanol, ethanol, isopropanol, ethylene glycol, and ethylene glycol monomethyl ether; and amides such as N-methylpyrrolidone and N,N-dimethylformamide.

As to these media, one species may be used alone or two or more species thereof may be mixed and used as a mixed medium. Among them, particularly the medium which provides excellent dispersibility of the non-electroconductive particles and has a low boiling point and high volatility is preferable because it can be removed at low temperature for a short period of time. Specifically, acetone, toluene, cyclohexanone, cyclopentane, tetrahydrofuran, cyclohexane, xylene, water, or N-methylpyrrolidone, or mixed media thereof is preferable.

In particular, when the (meth)acrylic polymer described above is used as the binder for a porous membrane, it is preferable that a water-based medium such as water is used as a medium to obtain the slurry for a porous membrane as an aqueous dispersion in order to reduce manufacturing processes and process load.

The solid content concentration in the slurry for a porous membrane can be appropriately adjusted to the concentration of the degree which allows application of the slurry and immersion into the slurry and attains viscosity allowing fluidity. The solid content may be generally about 10% to 50% by weight.

The ingredients other than the solid content are to be volatilized by a drying step and include the aforementioned medium as well as, for example, a dissolvent in which the non-electroconductive particles and the binder for a porous membrane have been dissolved or dispersed in preparation and addition thereof.

The slurry for a porous membrane of the present invention is for forming the porous membrane of the present invention. Therefore, the content ratio of the non-electroconductive particles, the binder for a porous membrane, and the optional ingredients (the aforementioned ingredients as optional ingredients of the porous membrane) in the total amount of the solid content of the slurry for a porous membrane may be as stated above for the porous membrane of the present invention.

In addition to the non-electroconductive particles, the binder for a porous membrane, the medium, and the aforementioned optional ingredients as optional ingredients of the porous membrane, the slurry for a porous membrane may further include optional ingredients such as a dispersant and an electrolytic solution additive having a function of, e.g., suppressing electrolytic solution decomposition. Such optional ingredients are not particularly limited as long as they do not affect the battery reaction.

[Method for Producing Slurry for Porous Membrane]

The method for producing the slurry for a porous membrane is not particularly limited, and the slurry for a porous membrane may be obtained by mixing the aforementioned non-electroconductive particles, the binder for a porous membrane, the medium, and optional ingredients that may be added if necessary.

In the present invention, by using the aforementioned ingredients, the slurry for a porous membrane in which the non-electroconductive particles are highly dispersed can be obtained regardless of a mixing method or a mixing order. The device for mixing is not particularly limited as long as it is a device which can uniformly mix the aforementioned ingredients, and a homomixer, a ball mill, a sand mill, a pigment disperser, a grinding machine, an ultrasonic disperser, a homogenizer, a planetary mixer, and others may be used. Among them, it is particularly preferable to use the homomixer which can add a moderate dispersion shear.

The viscosity of the slurry for a porous membrane is preferably 10 mPa·s to 10,000 mPa·s, more preferably 50 to 500 mPa·s in view of uniform coating ability and slurry stability over the lapse of time. The aforementioned viscosity is a value measured using a Brookfield viscometer at 25° C. and the number of revolutions of 60 rpm.

In the present invention, the porous membrane has a membranous shape. The porous membrane may be an article which can keep the shape as a membrane independently (i.e., without support by a substrate). However, the porous membrane may be a layer formed on a substrate, which does not independently keep the shape as a membrane. In the present invention, the porous membrane may usually be the latter. A complex of the porous membrane and the substrate used for forming the porous membrane as it is may be used in the battery as, e.g., a separator.

In an aspect of the method for manufacturing the porous membrane of the present invention, the substrate is a component in the battery and a component which preferably has the porous membrane. Specifically, it is preferable that an electrode for a secondary battery or a separator is used as the substrate for forming thereon the porous membrane.

In the method for manufacturing the porous membrane of the present invention, the porous membrane may be formed on the substrate other than the electrode or the organic separator layer. When the porous membrane of the present invention is formed on the substrate other than the electrode or the organic separator layer, the porous membrane may be peeled off from the substrate and directly laminated on the electrode or the organic separator layer in assembling of the battery. In this case, a suitable peelable film such as a publicly known peelable film may be used as the substrate.

The method for applying the slurry for a porous membrane onto the substrate is not particularly limited. Examples of the method may include a doctor blade method, a dip method, a reverse roll method, a direct roll method, a gravure method, an extrusion method, and a brush application method. Among them, the dip method and the gravure method are preferable since thereby a uniform porous membrane can be obtained.

Examples of the method for drying the slurry layer obtained by application may include drying with hot air, warm air, and low humid air, vacuum drying, and drying methods with (far-)infrared ray and electron beam. The drying temperature may be changed in accordance with the species of the medium to be used. When a low-volatile medium such as N-methylpyrrolidone is used, it is preferable that drying is performed at a high temperature of 120° C. or more with a blast-type dryer for complete removal of the medium. On the other hand, when a high-volatile medium is used, drying may also be performed at a low temperature of 100° C. or less. When the porous membrane is formed on the organic separator which will be described below, it is preferable to perform drying at a low temperature of 100° C. or less because drying has to be performed without causing contraction of the organic separator.

Subsequently, if necessary, a press treatment using, e.g., mold press, or roll press may be performed for improving adhesion between the electrode mixed material layer and the porous membrane. However, in this case, an excessive pressure treatment may reduce the void ratio of the porous membrane, and accordingly, pressure and a pressing time are appropriately controlled.

[Shape of Porous Membrane]

The thickness of the porous membrane is not particularly limited and appropriately set depending on the use or the technical field for application of the porous membrane. When it is too thin, a uniform membrane cannot be formed. On the other hand, when it is too thick, the capacity per volume (weight) in the battery is decreased. Accordingly, the thickness is preferably 1 to 10 μm, and more preferably 2 to 7 μm.

The porous membrane of the present invention is formed on the surface of the electrode mixed material layer or the organic separator layer of the secondary battery electrode, and is particularly preferably used as a protective membrane for the electrode mixed material layer or a separator. The secondary battery electrode on which the porous membrane is formed is not particularly limited, and the porous membrane of the present invention may be formed onto electrodes having a variety of constitutions. In addition, the porous membrane may be formed on the surface of either the positive electrode or the negative electrode of the secondary battery, or may be formed on the surfaces of both the positive electrode and the negative electrode.

[Electrode for Secondary Battery]

The electrode for a secondary battery of the present invention comprises a current collector; an electrode mixed material layer which includes an electrode active material and a binding agent for an electrode mixed material layer and adheres on the current collector; and the porous membrane of the present invention which is formed on the surface of the electrode mixed material layer.

[Current Collector]

The current collector is not particularly limited as long as it is a material which has electroconductivity and electrochemical durability. In view of having thermal resistance, metal materials such as iron, copper, aluminum, nickel, stainless steel, titanium, tantalum, gold, and platinum are preferable. Among them, aluminum is particularly preferable for the positive electrode of the lithium ion secondary battery and copper is particularly preferable for the negative electrode of the lithium ion secondary battery. The shape of the current collector is not particularly limited, but is preferably in the shape of a sheet having a thickness of about 0.001 to 0.5 mm. It is preferable that the current collector is previously subjected to a surface roughening treatment before use for increasing the adhesive strength of the electrode mixed material layer. Examples of the surface roughening method may include a mechanical polishing method, an electrolytic polishing method, and a chemical polishing method. In the mechanical polishing method, polishing cloth and or paper having abrasive particles adhering thereon, grinding stone, emery buff, wire brush provided with, e.g., steel wire, and others are used.

Furthermore, in order to increase the adhesive strength and the electroconductivity of the electrode mixed material layer, an intermediate layer may be formed on the surface of the current collector.

[Electrode Active Material]

The electrode active material for use in the electrode for a secondary battery of the present invention may be selected depending on the secondary battery in which the electrode is used. Examples of the secondary battery may include a lithium ion secondary battery and a nickel metal hydride secondary battery.

When the electrode for a secondary battery of the present invention is used for the positive electrode of the lithium ion secondary battery, the electrode active material for the positive electrode of the lithium ion secondary battery (positive electrode active material) is roughly classified into those composed of an inorganic compound and those composed of an organic compound.

Examples of the positive electrode active material composed of an inorganic compound may include a transition metal oxide, a complex oxide of lithium and transition metal, and a transition metal sulfide. As the aforementioned transition metal, Fe, Co, Ni, Mn, and others are used. Specific examples of the inorganic compound used for the positive electrode active material may include lithium-containing complex metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may have partial elemental substitution. As the positive electrode active material composed of an organic compound, electroconductive polymer compounds such as polyacetylene and poly-p-phenylene may be used. An iron-based oxide having poor electroconductivity may be used as an electrode active material covered with a carbon material by reduction firing with the existence of a carbon source substance. These compounds may have partial elemental substitution.

The positive electrode active material for the lithium ion secondary battery may be a mixture of the aforementioned inorganic compound and organic compound. The particle diameter of the positive electrode active material is appropriately selected from the viewpoint of optional constituents of the battery. In view of improvement in battery properties such as rate property and cycle property, the 50% cumulative volume diameter thereof is usually 0.1 to 50 and preferably 1 to 20 μm. When the 50% cumulative volume diameter is in this range, it is possible to obtain a secondary battery with large charge and discharge capacity and to enable easy handling in the manufacturing process of the slurry for an electrode and the electrode. The 50% cumulative volume diameter can be obtained by measuring particle size distribution with laser diffraction.

When the electrode for a secondary battery of the present invention is used for the negative electrode of the lithium ion secondary battery, examples of the electrode active material for the negative electrode for the lithium ion secondary battery (negative electrode active material) may include carbonaceous materials such as amorphous carbon, graphite, natural graphite, mesocarbon microbeads, and pitch-based carbon fiber; and electroconductive polymer compounds such as polyacene. As the negative electrode active material, metals such as silicon, tin, zinc, manganese, iron, and nickel, and alloys thereof; and oxides and sulfates of the aforementioned metals or alloys may also be used. In addition, metal lithium, lithium alloys such as Li—Al, Li—Bi—Cd and Li—Sn—Cd, lithium transition metal nitrides, silicon, and others may also be used. As an electrode active material, a material having a surface to which an electroconductivity imparting material adheres by a mechanical modifying method may also be used. The particle diameter of the negative electrode active material is appropriately selected from the viewpoint of other constituents of the battery. In view of improvement in battery properties such as initial efficiency, rate property, and cycle property, the 50% cumulative volume diameter thereof is usually 1 to 50 and preferably 15 to 30 μm.

When the electrode for a secondary battery of the present invention is used for a positive electrode of a nickel metal hydride secondary battery, examples of an electrode active material for the positive electrode for the nickel metal hydride secondary battery (positive electrode active material) may include nickel hydroxide particles. The nickel hydroxide particles may contain cobalt, zinc, cadmium, or others in a solid solution state. The nickel hydroxide particles may have a surface coated with an alkaline-heat-treated cobalt compound. Further, the nickel hydroxide particles may contain an additive such as cobalt compounds such as cobalt oxide, metal cobalt, and cobalt hydroxide; zinc compounds such as metal zinc, zinc oxide, and zinc hydroxide; and rare earth compounds such as erbium oxide in addition to yttrium oxide.

When the electrode for a secondary battery of the present invention is used for the negative electrode of the nickel metal hydride secondary battery, as an electrode active material for the negative electrode for the nickel metal hydride secondary battery (negative electrode active material), hydrogen-absorption alloy particles may be any of those which can absorb hydrogen that has been electrochemically generated in an alkali electrolytic solution during battery charging and can easily release the absorbed hydrogen during discharging, and are not particularly limited. The particles composed of AB5 type, TiNi-based, and TiFe-based hydrogen-absorbing alloys are preferable. Specific examples thereof may include LaNi5, MmNi5 (Mm is a misch metal), and LmNi5 (Lm is at least one species selected from rare earth elements including La), as well as multielement-type hydrogen-absorption alloy particles in which a part of Ni in these alloys is substituted with one or more species of element selected from the group consisting of, e.g., Al, Mn, Co, Ti, Cu, Zn, Zr, Cr, and B. In particular, hydrogen-absorption alloy particles having a composition represented by a general formula: LmNiwCoxMnyAlz (the total of the atomic ratios w, x, y, and z satisfies 4.80≤w+x+y+z≤5.40) is suitable since micronization with the progress of charge-discharge cycle is suppressed and thereby the charge-discharge cycle life is improved.

[Binding Agent for Electrode Mixed Material Layer]

In the present invention, the electrode mixed material layer includes a binding agent (binding agent for an electrode mixed material layer) in addition to the electrode active material. By including the binding agent, the binding property of the electrode mixed material layer in the electrode is improved, the strength against mechanical force applied during, e.g., winding process of the electrode is increased, and detachment of the electrode mixed material layer in the electrode is suppressed, resulting in reduced risk of, e.g., the short circuit caused by the detached object.

As the binding agent for the electrode mixed material layer, a variety of resin ingredients may be used. For example, polyethylene, polytetrafluoroethylene (PTFE), polyvinylidene fluoride (PVDF), a tetrafluoroethylene-hexafluoropropylene copolymer (FEP), polyacrylic acid derivatives, and polyacrylonitrile derivatives may be used. One of them may be used alone, or two or more species thereof may be used in combination.

Furthermore, the soft polymers exemplified below may also be used as the binding agent for the electrode mixed material layer.

Examples of the soft polymer may include acrylic soft polymers which are homopolymers of acrylic acid or methacrylic acid derivatives, or copolymers of such a monomer with another monomer copolymerizable therewith, such as polybutyl acrylate, polybutyl methacrylate, polyhydroxyethyl methacrylate, polyacrylamide, polyacrylonitrile, a butyl acrylate-styrene copolymer, a butyl acrylate-acrylonitrile copolymer and a butyl acrylate-acrylonitrile-glycidyl methacrylate copolymer;

isobutylene-based soft polymers such as polyisobutylene, isobutylene-isoprene rubber and an isobutylene-styrene copolymer;

diene-based soft polymers such as polybutadiene, polyisoprene, a butadiene-styrene random copolymer, an isoprene-styrene random copolymer, an acrylonitrile-butadiene copolymer, an acrylonitrile-butadiene-styrene copolymer, a butadiene-styrene-block copolymer, a styrene-butadiene-styrene-block copolymer, an isoprene-styrene-block copolymer, and a styrene-isoprene-styrene-block copolymer;

silicon-containing soft polymers such as dimethylpolysiloxane, diphenylpolysiloxane, and dihydroxypolysiloxane;

olefin-based soft polymers such as liquid polyethylene, polypropylene, poly-1-butene, an ethylene-α-olefin copolymer, a propylene-α-olefin copolymer, an ethylene-propylene-diene copolymer (EPDM), and an ethylene-propylene-styrene copolymer;

vinyl-based soft polymers such as polyvinyl alcohol, polyvinyl acetate, polyvinyl stearate, and a vinyl acetate-styrene copolymer;

epoxy-based soft polymers such as polyethylene oxide, polypropylene oxide, and epichlorhydrin rubber;

fluorine-containing soft polymers, such as vinylidene fluoride-based rubber and tetrafluoroethylene-propylene rubber; and other soft polymers such as natural rubber, polypeptide, protein, polyester-based thermoplastic elastomer, vinyl chloride-based thermoplastic elastomer, and polyamide-based thermoplastic elastomer. These soft polymers may have a crosslinked structure or may have a functional group introduced by modification.

The amount of the binding agent for an electrode mixed material layer in the electrode mixed material layer is preferably 0.1 to 5 parts by weight, more preferably 0.2 to 4 parts by weight, and particularly preferably 0.5 to 3 parts by weight with respect to 100 parts by weight of the electrode active material. When the amount of the binding agent for an electrode mixed material layer in the electrode mixed material layer is in the aforementioned range, the active material can be prevented from falling off the electrode without inhibiting battery reaction.

The binding agent for an electrode mixed material layer is prepared as a solution or a dispersion liquid for manufacturing the electrode. The viscosity at that time is usually in the range of 1 mPa·s to 300,000 mPa·s, and preferably 50 mPa·s to 10,000 mPa·s. The aforementioned viscosity is a value measured using a Brookfield viscometer at 25° C. and the number of revolutions of 60 rpm.

In the present invention, the electrode mixed material layer may contain an electroconductivity imparting material and a reinforcing material. As the electroconductivity imparting material, electroconductive carbon such as acetylene black, Ketjen black, carbon black, graphite, vapor-grown carbon fiber, and carbon nanotube may be used. Examples may include carbon powders such as black lead; and fiber and foil of a variety of species of metals. As the reinforcing material, a variety of species of inorganic and organic spherical, plate-like, rod-like or fibrous fillers may be used. By using the electroconductivity imparting material, electrical contact between the electrode active materials can be improved. Particularly when it is used in the lithium ion secondary battery, discharge rate property can be improved. The amount of the electroconductivity imparting material or the reinforcing agent used is usually 0 to 20 parts by weight, and preferably 1 to 10 parts by weight with respect to 100 parts by weight of the electrode active material.

The electrode mixed material layer may be formed by pasting a slurry including the binding agent for an electrode mixed material layer, the electrode active material, and the medium (which may be referred to hereinbelow as a "slurry for forming an electrode mixed material layer") to the current collector.

The medium may be any of those which dissolve the aforementioned binding agent for an electrode mixed material layer or disperse it in a particle form. Those which dissolve the binding agent for an electrode mixed material layer are preferable. When the medium which dissolves the binding agent for an electrode mixed material layer is used, the binding agent for an electrode mixed material layer is adsorbed onto the surface, and dispersion of, e.g., the electrode active material is thereby stabilized.

As the medium for the slurry for forming an electrode mixed material layer, any of water and an organic solvent may be used. Examples of the organic solvent may include cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; acylonitriles such as acetonitrile and propionitrile; ethers such as tetrahydrofuran and ethylene glycol diethyl ether; alcohols such as methanol, ethanol, isopropanol, ethylene glycol, and ethylene glycol monomethyl ether; and amides such as N-methylpyrrolidone and N,N-dimethylformamide. These media may be appropriately selected in view of drying rate or environmental aspects, and one species thereof may be used alone, or a mixture of two or more species may also be used.

The slurry for forming an electrode mixed material layer may contain a thickener. A polymer soluble in the medium used for the slurry for forming an electrode mixed material layer may be used. As the thickener, the thickeners exemplified in the description of the porous membrane of the present invention may be used. The using amount of the thickener is preferably 0.5 to 1.5 parts by weight with respect to 100 parts by weight of the electrode active material. When using amount of the thickener is in this range, good coating property and good adhesion to the current collector can be achieved.

Moreover, in order to enhance the stability and the life of the battery, other ingredients than the aforementioned ones, such as trifluoropropylene carbonate, vinylene carbonate, catechol carbonate, 1,6-dioxaspiro[4,4]nonane-2,7-dione, and 12-crown-4-ether, may also be used. Furthermore, these ingredients may be used as a constituent of the electrolytic solution which will be described below.

The amount of the medium in the slurry for forming an electrode mixed material layer is adjusted depending on the species of, e.g., the electrode active material and the binding agent for an electrode mixed material layer so as to obtain a viscosity of the slurry suitable for coating. Specifically, adjustment is effected so that the concentration of the solid content that is the total amount of the electrode active material, the binding agent for an electrode mixed material layer, and the optional additives such as the electroconductivity imparting material in the slurry for forming an electrode mixed material layer is preferably 30% to 90% by weight, and more preferably 40% to 80% by weight.

The slurry for forming an electrode mixed material layer may be obtained by mixing using a mixer the electrode active material, the binding agent for an electrode mixed material layer, the optional additives that are added if necessary, such as the electroconductivity imparting material, and the medium. The mixing may be performed by supplying the aforementioned ingredients together into the mixer. When the electrode active material, the binding agent for an electrode mixed material layer, the electroconductivity imparting material, and the thickener are used as constituents of the slurry for forming an electrode mixed material layer, it is preferable to mix the electroconductivity imparting material and the thickener in the medium to allow the electroconductivity imparting material to be dispersed in a fine particle form, and subsequently add the binding agent for an electrode mixed material layer and the electrode active material thereto and mix them, since thereby the dispersibility of the obtained slurry can be improved. The mixer for use may be, e.g., a ball mill, a sand mill, a pigment disperser, a grinding machine, an ultrasonic disperser, a homogenizer, a planetary mixer, and a Hobart mixer. It is preferable to use a ball mill since thereby aggregation of the electroconductivity imparting material and the electrode active material can be suppressed.

The particle size of the slurry for forming an electrode mixed material layer is preferably 35 µm or less, more preferably 25 µm or less. When the particle size of the slurry is in the aforementioned range, high dispersibility of the electric conduction material can be achieved and a uniform electrode can be obtained.

The method for manufacturing the electrode mixed material layer may be a method wherein the electrode mixed material layer is attached in a form of a layer to at least one side, preferably both sides of the aforementioned current collector. For example, the aforementioned slurry for forming an electrode mixed material layer is applied onto the current collector and dried, and a heat treatment is then performed at 120° C. or more for 1 hour or more, to form the electrode mixed material layer. The method for applying the slurry for forming an electrode mixed material layer onto the current collector is not particularly limited. Examples of the method may include a doctor blade method, a dip method, a reverse roll method, a direct roll method, a gravure method, an extrusion method, and a brush applying method. Examples of the drying method may include drying with hot air, warm air, and low humid air, vacuum drying, and drying methods with (far-)infrared ray and electron beam.

It is preferable to subsequently perform a press treatment using, e.g., mold press and roll press, for decreasing the void ratio of the electrode mixed material layer of the electrode. The void ratio is preferably in the range of 5% to 15%, and more preferably 7% to 13%. Excessively high void ratio results in lower charging efficiency and discharging efficiency. Too low void ratio causes problems such as difficulty in obtaining high volume capacity, and high tendency to cause peel-off of the electrode mixed material layer to induce defects.

Furthermore, when a curable polymer is used, it is preferable to cure the polymer.

The thickness of the electrode mixed material layer is usually 5 to 300 µm, and preferably 10 to 250 µm in both the positive electrode and the negative electrode.

[Separator for Secondary Battery]

The separator for a secondary battery of the present invention comprises an organic separator layer and the aforementioned porous membrane of the present invention formed on the separator layer.

As the organic separator layer, publicly known ones such as a separator including polyolefin resin such as polyethylene and polypropylene, and aromatic polyamide resin are used.

As the organic separator layer used in the present invention, a porous membrane which does not have electron conductivity but has ion conductivity, has high resistance to an organic solvent, and has a fine pore diameter is used. Examples of the porous membrane may include microporous membranes composed of resins such as polyolefins (polyethylene, polypropylene, polybutene, polyvinyl chloride) and mixtures or copolymers thereof, microporous membranes composed of resins such as polyethylene terephthalate, polycycloolefin, polyethersulfone, polyamide, polyimide, polyimidoamide, polyaramide, polycycloolefin, nylon, and polytetrafluoroethylene, or woven fibers of polyolefins, or nonwoven fabrics thereof, and aggregate of insulating material particles. Among them, the microporous membranes composed of polyolefin resins are preferable because thereto the aforementioned slurry for a porous membrane can be applied in an excellent manner so that the membrane thickness of the entire separator can be reduced to increase the ratio of the active material in the battery and increase the capacity per volume.

The thickness of the organic separator layer is usually 0.5 to 40 µm, preferably 1 to 35 µm, and more preferably 5 to 30 µm. The thickness in this range results in less resistance caused by the separator in the battery and good workability during coating operation onto the organic separator layer.

In the present invention, examples of the polyolefin resin as the material of the organic separator layer may include homopolymers and copolymers of, e.g., polyethylene and polypropylene, as well as mixtures thereof. Examples of polyethylene may include low-density, medium-density, and high-density polyethylenes, and the high-density polyethylene is preferable in view of sticking strength and mechanical strength. Two or more species of these polyethylenes may be mixed for the purpose of imparting flexibility. The polymerization catalyst used for these polyethylenes is not particularly limited, and examples thereof may include a Ziegler-Natta catalyst, a Phillips catalyst, and a metallocene catalyst. In view of achieving both mechanical strength and high permeability, the viscosity mean molecular weight of polyethylene is preferably 100,000 to 12,000,000, and more preferably 200,000 to 3,000,000. Examples of polypropylene may include homopolymers, random copolymers, and block copolymers. They may be used alone or as a mixture of two or more species. The polymerization catalyst is also not particularly limited, and examples thereof may include a Ziegler-Natta catalyst and a metallocene catalyst. Tacticity is also not particularly limited, and isotactic, syndiotactic or atactic polypropylene may be used. It is desired to use isotactic polypropylene in view of low cost. Furthermore, the polyolefin may contain proper amount of polyolefin other than polyethylene or polypropylene and additives such as an antioxidant and a nucleating additive in the range which does not impair the effects of the present invention.

The method for producing a polyolefin organic separator layer may be those that are publicly known and publicly used. Examples of the method to be selected may include a dry method wherein polypropylene or polyethylene is melt-extruded to form a film, subsequently annealing is performed at low temperature for growing crystal domain, and then stretching is performed in this state to extend an amorphous region, to thereby form a microporous membrane; and a wet method wherein a hydrocarbon solvent and other low-molecular materials are mixed with polypropylene or polyethylene, subsequently a film is formed, and then, when the solvent and the low molecules has begun to gather in an amorphous phase to form an island phase, the solvent and the low molecules is removed from the film with another easily volatized solvent, to thereby form a microporous membrane. Among them, the dry method is preferable since thereby large voids are easily obtained for the purpose of lowering the resistance.

The organic separator layer used in the present invention may optionally include a filler and fiber compound for the purpose of controlling the strength, the hardness, and the heat shrinkage rate. In addition, in the formation of the aforementioned porous membrane, for the purpose of improving the adhesion or lowering the surface tension with the electrolytic solution to improve impregnation of the solution, the organic separator may previously be coated with a low-molecular compound or a polymer compound, or be subjected to a treatment with electromagnetic radiation such as ultraviolet radiation, or a plasma treatment with, e.g., a corona discharge/plasma gas. In particular, it is preferable that the organic separator is coated with a polymer compound containing a polar group such as a carboxylic acid group, a hydroxyl group and a sulfonic acid group since it can be well impregnated with the electrolytic solution and therewith adhesion to the aforementioned porous membrane is easily obtained.

The separator of the present invention may have the porous membrane only on one side of the organic separator layer, or may have the porous membrane on both sides of the organic separator layer.

[Secondary Battery]

The secondary battery of the present invention comprises a positive electrode, a negative electrode, a separator, and an electrolytic solution, in which at least any one of the positive electrode, the negative electrode, and the separator has the aforementioned porous membrane of the present invention.

Examples of the secondary battery may include a lithium ion secondary battery and a nickel metal hydride secondary battery, and the lithium ion secondary battery is preferable because its improvement in safety is the most required and introduction of the porous membrane is therefore the most effective, and because improvement in rate property is a problem to be solved. The case of use in the lithium ion secondary battery will be described hereinbelow.

[Electrolytic Solution]

As the electrolytic solution for the lithium ion secondary battery, an organic electrolytic solution in which a supporting electrolyte is dissolved in an organic solvent is used. As the supporting electrolyte, a lithium salt is used. The lithium salt is not particularly limited, and examples thereof may include $LiPF_6$, $LiAsF_6$, $LiBF_4$, $LiSbF_5$, $LiAlCl_4$, $LiClO_4$, $CF_3SO_3L_1$, $C_4F_9SO_3Li$, $CF_3COOLi$, $(CF_3CO)_2NLi$, $(CF_3SO_2)_2NLi$, and $(C_2F_5SO_2)NLi$. Among them, $LiPF_6$, $LiClO_4$, and $CF_3SO_3Li$ are preferable since they are easily dissolved in a solvent and show high degree of dissociation. Two or more species of them may be used in combination. Use of the supporting electrolyte having higher degree of dissociation results in higher lithium ion conductivity. Therefore, the lithium ion conductivity can be controlled by selecting the species of the supporting electrolyte.

The organic solvent for the electrolytic solution of a lithium ion secondary battery is not particularly limited as long as it can dissolve the supporting electrolyte. Examples of the preferable organic solvent for use may include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulphur-containing compounds such as sulfolane and dimethyl sulfoxide. Furthermore, a mixture of these solvents may also be used. Among them, carbonates are preferable because of their high permittivity and wide range of stable potential. Use of the solvent having lower viscosity results in higher lithium ion conductivity. Therefore, the lithium ion conductivity can be controlled by selecting the species of the solvent.

The concentration of the supporting electrolyte in the electrolytic solution for the lithium ion secondary battery is usually 1% to 30% by weight, and preferably 5% by weight to 20% by weight. The electrolyte is usually used at a concentration of 0.5 to 2.5 mol/L depending on the species of the supporting electrolyte. When the concentration of the supporting electrolyte is either excessively low or excessively high, the ion conductivity tends to be decreased. Use of the electrolytic solution having lower concentration results in higher swelling degree of the polymer particles. Therefore, the lithium ion conductivity can be controlled by the concentration of the electrolytic solution.

[Separator and Electrode]

As the separator, the separator of the present invention having the porous membrane may be used. However, other separators may be used as well. For example, those exemplified above as the organic separator layer as they are may be used as the separator.

As the positive electrode and the negative electrode, the electrode for a secondary battery of the present invention which has the porous membrane may be used, but other electrodes may be used as well. For example, the aforementioned multilayer product composed of the current collector and the electrode mixed material layer adhering thereon as it is may be used as the electrode.

However, in the secondary battery of the present invention, at least any one of the positive electrode, the negative electrode, and the separator has the porous membrane.

Examples of the specific method for manufacturing the lithium ion secondary battery may include a method in which the positive electrode and the negative electrode are stacked via the separator, which is then wound or folded in accordance with the battery shape and installed into the battery container, then the electrolytic solution is injected into the battery container, and the battery container is sealed. The porous membrane of the present invention is formed on any of the positive electrode, the negative electrode, and the separator. Alternatively, it is also possible to laminate an independent porous membrane. If necessary, pressure increase inside the battery and overcharge/overdischarge can be prevented by installing expanded metal, overcurrent protection elements such as a fuse and a PTC element, and a lead plate, etc. The shape of the battery may be any of a coin shape, a button shape, a sheet shape, a cylindrical shape, a square shape, and a flat shape.

EXAMPLES

The present invention will be described hereinbelow in more detail with reference to Examples, but the present invention is not limited thereto. In the description about the quantitative ratio in Examples, "%" and "part" represent weight ratio unless otherwise specified.

In Examples and Comparative Examples, evaluation of properties was performed as follows.

(Number Mean Particle Diameter and Variation Coefficient of Particle Diameter of Non-Electroconductive Particles)

A laser diffraction scattering particle size distribution analyzer (LS230: produced by Beckman Coulter, Inc.) was used for measurement. The number mean particle diameter herein refers to a particle diameter at 50% of the cumulative distribution in the particle diameter-number cumulative distribution. The variation coefficient of the particle diameter was calculated from the number mean particle diameter and the standard deviation.

(Arithmetic Mean Value of Shape Factor and Variation Coefficient of Shape Factor of Non-Electroconductive Particles)

An image of the non-electroconductive particles magnified by 50000 times was photographed with the field emission scanning electron microscope (Hitachi S-4700: produced by Hitachi High-Technologies Corporation). Then the measurement was performed by analyzing the photographed image using the image analysis software (analySIS Pro: produced by Olympus Corporation) based on this photograph. Upon this measurement, the noise in the image was removed, and 100 non-electroconductive particles were arbitrary selected. The shapes of the selected particles were observed and the shape factor was calculated in accordance with the following formula (A).

$$\text{Shape factor} = ((\text{Maximum Diameter}/2)^2 \times \pi)/\text{Projected Area} \quad \text{Formula (A)}$$

In the formula, the maximum diameter refers to the particle width with the maximum distance between parallel lines when a projection image of the non-electroconductive particle on a plane surface is sandwiched by two parallel lines. The projected area refers to the area of the projection image of the non-electroconductive particle on a plane surface.

(T10 Value of Non-Electroconductive Particles)

Under a nitrogen atmosphere, the temperature (° C.) at which the reduced ratio of the non-electroconductive particles reaches 10% by weight was observed by heating at a heating rate of 10° C./minute from 30° C. with the thermo gravimetry/differential thermal analyzer (EXSTAR TG/DTA6000: produced by SII NanoTechnology Inc.).

(Measurement of Metal Ion Content of Non-Electroconductive Particles)

The metal ions included in the non-electroconductive particles were quantitatively analyzed using inductively coupled plasma-atomic emission spectrometer ICP-AES (SPS-5100: produced by SII NanoTechnology Inc.).

The non-electroconductive particles was incinerated in an electric furnace at 550° C. and dissolved in a nitric acid aqueous solution, and alumina was dissolved in aqua regia for measurement.

The metal ions to be quantitatively analyzed were Ca, Co, Cr, Cu, Fe, Mg, Ni, and Zn which may affect battery performance, and the total amount of these ions was taken as the metal ion content of the non-electroconductive particles. The obtained metal ion content was evaluated based on the following criteria.

(Evaluation Criteria)

Good: less than 50 ppm

Poor: 50 ppm or more (Powder Falling Property of Electrode with Porous Membrane or Separator with Porous Membrane)

The electrode with the porous membrane or the separator with the porous membrane was punched out in a form of a disc having a diameter of 19 mm with an electrode punching machine, and the presence or absence of adhesion of a porous membrane piece to a punching edge was visually observed and graded in accordance with the following criteria. Occurrence of adhesion of the porous membrane piece to the punching edge at a later stage is indicative of better powder falling property of the porous membrane layer formed on the electrode mixed material layer or the organic separator layer. The presence or absence of adhesion of the porous membrane piece was checked every 100 times of punching up to 1000 times.

(Evaluation Criteria)

A: no adhesion of the porous membrane piece was observed even after 1000 times of punching.

B: adhesion of the porous membrane piece occurred after 501 to 999 times of punching.

C: adhesion of the porous membrane piece occurred after 101 to 500 times of punching.

D: adhesion of the porous membrane piece occurred after 100 or less times of punching.

(Water Content of Electrode with Porous Membrane or Separator with Porous Membrane)

The electrode or the separator is cut into 10 cm width×10 cm length to prepare a test sample. The test sample is left stand in a dry room (temperature; 25° C., dew point; −60° C. or less) for 1 hour. Subsequently, the water content of the test sample is measured based on the water evaporation method (vaporization temperature; 150° C.) using a coulometric moisture titrator, and the water content per unit volume of the electrode or the separator is calculated.

A: less than 200 μg/cc

B: 200 μg/cc or more and less than 500 μg/cc

C: 500 μg/cc or more and less than 1000 μg/cc

D: 1000 μg/cc or more (Cycle Property)

Each of ten coin-type battery cells is repeatedly charged and discharged by the constant current method of 0.2 C wherein charging is performed to 4.3 V and discharging is performed to 3.0 V, and the electric capacity is measured. The mean value of 10 cells is taken as a measured value. The charge-discharge capacity retention ratio represented by the ratio (%) of the electric capacity after completing 60 cycles relative to the electric capacity after completing 5 cycles is calculated, and the cycle property is evaluated in accordance with the following criteria. Higher value of this ratio is indicative of better cycle property.
(Evaluation Criteria)
  A: 80% or more
  B: 70% or more and less than 80%
  C: 60% or more and less than 70%
  D: less than 60%
  (Reliability Test of Separator with Porous Membrane)

The separator with the porous membrane was punched out in a form of a disc having a diameter of 19 mm, immersed in a methanol solution containing 3% by weight of the nonionic surfactant (produced by Kao Corporation; Emulgen 210P), and then dried in the air. This disc-shaped separator was impregnated with an electrolytic solution, and sandwiched between a pair of disc-shaped SUS plates (diameter; 15.5 mm) to form a layered structure of (SUS plate)/(disc-shaped separator)/(SUS plate). As the electrolytic solution in this procedure, a solution was used in which 1 mol/L of $LiPF_6$ was dissolved in a mixed solvent of ethylene carbonate (EC) and diethyl carbonate (DEC) at EC:DEC=1:2 (volume ratio at 20° C.). This was enclosed in a 2032-type coin cell. The coin cell was connected to a lead wire, which was then attached to a thermocouple and placed in an oven. While applying an alternating current having an amplitude of 10 mV and a frequency of 1 kHz, the temperature was raised to 200° C. at a heating rate of 1.6° C./minute, and the cell resistance was measured during this period to check the status of short circuit occurrence. This test was repeated 10 times and evaluated in accordance with the following evaluation criteria.
(Evaluation Criteria)
  Good: without occurrence of short circuit
  Poor: with occurrence of short circuit
  (Reliability Test of Electrode with Porous Membrane)

A separator (monolayer separator made of polypropylene, porosity; 55%, thickness; 25 μm, the same as the one used as the "organic separator layer" in Example 1) was punched out in a form of a disc having a diameter of 19 mm, immersed in a methanol solution containing 3% by weight of the nonionic surfactant (produced by Kao Corporation; Emulgen 210P), and then dried in the air. On the other hand, the electrode to be measured was punched out in a form of a disc having a diameter of 19 mm. They were impregnated with an electrolytic solution and stacked. This was then sandwiched between a pair of disc-shaped SUS plates (diameter; 15.5 mm) to form a layered structure of (SUS plate)/(disc-shaped separator)/(disc-shaped electrode)/(SUS plate). The disc-shaped electrode was placed so that the porous membrane side surface thereof was on the separator side. As the electrolytic solution in this procedure, a solution was used in which 1 mol/L of $LiPF_6$ was dissolved in a mixed solvent of ethylene carbonate (EC) and diethyl carbonate (DEC) at EC:DEC=1:2 (volume ratio at 20° C.). This was enclosed in a 2032-type coin cell. The coin cell was connected to a lead wire, which was then attached to a thermocouple and placed in an oven. While applying an alternating current having an amplitude of 10 mV and a frequency of 1 kHz, the temperature was raised to 200° C. at a heating rate of 1.6° C./minute, and the cell resistance was measured during this period to check the status of short circuit occurrence. This test was repeated 10 times and evaluated in accordance with the following evaluation criteria.
(Evaluation Criteria)
  Good: with occurrence of short circuit
  Poor: without occurrence of short circuit
  (Uniformity of Electrode with Porous Membrane or Separator with Porous Membrane)

The separator with the porous membrane or the electrode with the porous membrane was cut into 6 cm width×1 m length, and the thickness of the cut separator with the porous membrane or electrode with the porous membrane was measured at 60 points, i.e., 3 points in the width direction× 20 points every 5 cm in the length direction. From the standard deviation and the mean value of the membrane thickness, the fluctuation was calculated based on the following formula and evaluated in accordance with the following criteria.

$$\text{Standard deviation of membrane thickness } \sigma = \sqrt{\frac{n\sum x^2 - (\sum x)^2}{n^2}}$$

Fluctuation of membrane thickness = $\sigma/x \times 100 (\%)$

In this formula, x represents the mean value of the membrane thickness, and n represents the number of measurement.
(Evaluation Criteria)
  A: less than 3%
  B: 3% or more and less than 10%
  C: 10% or more Example 1

1-1. Manufacture of Seed Polymer Particles A

In a reactor equipped with a stirrer, 95.0 parts of styrene, 5.0 parts of acrylic acid, 1.0 part of sodium dodecylbenzenesulfonate, 100 parts of ion exchange water, and 0.5 parts of potassium persulfate were placed and polymerization was performed at 80° C. for 8 hours.

An aqueous dispersion of seed polymer particles A having a number mean particle diameter of 58 nm was thereby obtained.

1-2. Manufacture of Seed Polymer Particles B

In a reactor equipped with a stirrer, 2 parts in terms of the solid content (i.e., based on the weight of seed polymer particles A) of the aqueous dispersion of the seed polymer particles A which was obtained in step (1-1), 0.2 parts of sodium dodecylbenzenesulfonate, 0.5 parts of potassium persulfate, and 100 parts of ion exchange water were placed and mixed to obtain a mixture A, and the temperature was raised to 80° C. Separately in a different container, 82 parts of styrene, 15.3 parts of methyl methacrylate, 2.0 parts of itaconic acid, 0.7 parts of acrylamide, 0.5 parts of sodium dodecylbenzenesulfonate, and 100 parts of ion exchange water were mixed to prepare a dispersion of monomer mixture 1. This dispersion of monomer mixture 1 was continuously added to the mixture A obtained above over 4 hours for performing polymerization. The temperature of the reaction system was maintained at 80° C. during continuous addition of the dispersion of monomer mixture 1 to perform the reaction. After the completion of the continuous addition, the reaction was further continued at 90° C. for 3 hours.

An aqueous dispersion of seed polymer particles B having a number mean particle diameter of 198 nm was thereby obtained.

1-3. Manufacture of Non-Electroconductive Particles

Subsequently, in a reactor equipped with a stirrer, 20 parts in terms of the solid content (i.e., based on the weight of seed polymer particles B) of the aqueous dispersion of seed polymer particles B which was obtained in step (1-2), 100 parts of the monomer mixture 2 (mixture of divinylbenzene and ethylvinylbenzene, monomer mixing ratio: divinylbenzene/ethylvinylbenzene=60/40, produced by Nippon Steel Chemical Co., Ltd., product name: DVB-570), 0.5 parts of sodium dodecylbenzenesulfonate, 4 parts of t-butylperoxy-2-ethylhexanoate (produced by NOF CORPORATION, trade name: Perbutyl O) as a polymerization initiator, 540 parts of ion exchange water, and 60 parts of ethanol were placed and stirred at 35° C. for 12 hours to allow the seed polymer particles B to completely absorb the monomer mixture 2 and the polymerization initiator. Subsequently, the resultant was polymerized at 90° C. for 7 hours. Then, steam was introduced thereto to remove unreacted monomers and ethanol.

An aqueous dispersion of non-electroconductive particles was thereby obtained.

The obtained non-electroconductive particles were measured for the number mean particle diameter, the variation coefficient of the particle diameter, the arithmetic mean value of the shape factor, the variation coefficient of the shape factor, the T10 value, and the metal ion content. The results are shown in Table 1. In addition, the image of the obtained non-electroconductive particles photographed with a scanning electron microscope is shown in FIG. 1.

1-4. Manufacture of Binder for Porous Membrane

In a reactor equipped with a stirrer, 70 parts of ion exchange water, 0.4 parts of sodium dodecylbenzenesulfonate, and 0.3 parts of potassium persulfate were placed and mixed to obtain a mixture B, and the temperature was raised to 60° C. Separately in a different container, 50 parts of ion exchange water, 0.8 parts of sodium dodecylbenzenesulfonate, 77.7 parts of 2-ethylhexyl acrylate, 19.85 parts of acrylonitrile, 2 parts of methacrylic acid, and 0.2 parts of allyl methacrylate were mixed to obtain a monomer mixture 3. This monomer mixture 3 was continuously added to the mixture B obtained above over 4 hours for performing polymerization. The temperature of the reaction system was maintained at 60° C. during continuous addition to perform the reaction. After the completion of the continuous addition, the reaction was further continued at 70° C. for 3 hours to obtain an aqueous dispersion liquid containing a binder.

The obtained binder aqueous dispersion liquid was cooled to 25° C. and then aqueous ammonia was added thereto to adjust pH to 7, and subsequently steam was introduced to remove unreacted monomers. Immediately thereafter, 0.25 parts of EDTA was added with respect to 100 parts of the solid content of the binder and mixed. The obtained mixture was filtrated through a stainless steel cloth of 200 meshes (aperture size; about 77 μm) while further adjusting the solid content concentration of the mixture with ion exchange water to obtain an aqueous dispersion liquid of a binder for a porous membrane, which has an mean particle diameter of 100 nm and a solid content concentration of 40%.

1-5. Manufacture of Slurry for Porous Membrane

The aqueous dispersion of the non-electroconductive particles obtained in step (1-3), the aqueous dispersion liquid of the binder for a porous membrane obtained in step (1-4), and carboxymethylcellulose (produced by Daicel Corporation, trade name: Daicel 1220) were mixed in water at a solid content weight ratio of 83.1:12.3:4.6 to obtain a slurry for a porous membrane.

1-6. Manufacture of Positive Electrode

To 95 parts of $LiCoO_2$ as a positive electrode active material, 3 parts in terms of the solid content of PVDF (polyvinylidene fluoride, produced by Kureha Corporation, trade name: KF-1100) as a binder was added, and 2 parts of acetylene black and 20 parts of N-methylpyrrolidone were further added and mixed by a planetary mixer to obtain an electrode composition for a positive electrode in a slurry form. This positive electrode composition was applied onto one side of aluminum foil having a thickness of 18 μm and dried at 120° C. for 3 hours. Then roll press was performed, to thereby obtain a positive electrode having a positive electrode mixed material layer and having an overall thickness of 100 μm.

1-7. Manufacture of Negative Electrode 98 parts of graphite having a particle diameter of 20 μm and a specific surface area of 4.2 $m^2/g$ as a negative electrode active material and 1 part in terms of the solid content of SBR (styrene-butadiene rubber, glass transition temperature: −10° C.) as a binder were mixed. To this mixture, 1.0 part of carboxymethylcellulose was further added and mixed by a planetary mixer to prepare an electrode composition for a negative electrode in a slurry form. This composition for a negative electrode was applied onto one side of copper foil having a thickness of 18 μm and dried at 120° C. for 3 hours. Then roll press was performed, to thereby obtain a negative electrode having a negative electrode mixed material layer and having an overall thickness of 100 μm.

1-8. Manufacture of Separator with Porous Membrane

A monolayer separator made of polypropylene (porosity; 55%, thickness; 25 μm) manufactured by the dry method was prepared as an organic separator layer. The slurry for a porous membrane obtained in step (1-5) was applied onto one side of this organic separator layer so that the thickness after drying was 5 μm, thereby obtaining a slurry layer. The slurry layer was dried at 50° C. for 10 minutes to form a porous membrane. Subsequently, the porous membrane was formed similarly on the other side of the organic separator layer. A separator with the porous membrane, which has the porous membranes on both sides, was thus obtained.

1-9. Manufacture of Secondary Battery Having Separator with Porous Membrane

The positive electrode obtained in step (1-6) was cut out in a form of a disc having a diameter of 13 mm to obtain a disc-shaped positive electrode. The negative electrode obtained in step (1-7) was cut out in a form of a disc having a diameter of 14 mm to obtain a disc-shaped negative electrode. The separator with the porous membrane obtained in step (1-8) was cut out in a form of a disc having a diameter of 18 mm to obtain a disc-shaped separator with the porous membrane.

The disc-shaped positive electrode was placed on the inner bottom of a coin-type outer container made of stainless steel equipped with a gasket made of polypropylene, the disc-shaped separator with the porous membrane was placed thereon, and the disc-shaped negative electrode was further placed thereon, to accommodate them in a container. The disc-shaped positive electrode was placed so that the aluminum foil side surface thereof was directed to the bottom of the outer container and the positive electrode mixed material layer side surface was directed upwardly. The disc-shaped negative electrode was placed so that the negative electrode mixed material layer side surface thereof was directed to the disc-shaped separator with the porous membrane and the copper foil side surface was directed upwardly.

An electrolytic solution was injected into the container such that air did not remain, and the outer container was covered with a stainless steel cap having a thickness of 0.2 mm via a gasket made of polypropylene and fastened to seal a battery can, thereby manufacturing a lithium ion secondary battery having a diameter of 20 mm and a thickness of about 3.2 mm (coin cell CR2032). As the electrolytic solution, a solution was used in which 1 mol/L of $LiPF_6$ was dissolved in a mixed solvent of ethylene carbonate (EC) and diethyl carbonate (DEC) at EC:DEC=1:2 (volume ratio at 20° C.)

1-10. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 1.

Example 2

2-1. Manufacture of Seed Polymer Particles B

An aqueous dispersion of seed polymer particles B was manufactured by the same procedure as step (1-2) of Example 1 except for the following points.

In preparing a dispersion of monomer mixture 1, in place of 82 parts of styrene, 15.3 parts of methyl methacrylate, 2.0 parts of itaconic acid, and 0.7 parts of acrylamide, 92 parts of styrene, 4.0 parts of methacrylic acid, and 4 parts of t-dodecyl mercaptan were added (that is, the dispersion of monomer mixture 1 comprises 92 parts of styrene, 4.0 parts of methacrylic acid, 4 parts of t-dodecyl mercaptan, 0.5 parts of sodium dodecylbenzenesulfonate, and 100 parts of ion exchange water).

2-2. Manufacture of Non-Electroconductive Particles

An aqueous dispersion of non-electroconductive particles was obtained by the same procedure as step (1-3) of Example 1 except for the following points.

As an aqueous dispersion of seed polymer particles B, in place of the one obtained in step (1-2) of Example 1, the aqueous dispersion obtained in the aforementioned (2-1) was used.

Instead of adding 100 parts of the monomer mixture 2 (product name: DVB-570), 55 parts of the monomer mixture 2 and 45 parts of styrene were added.

Figure 3:
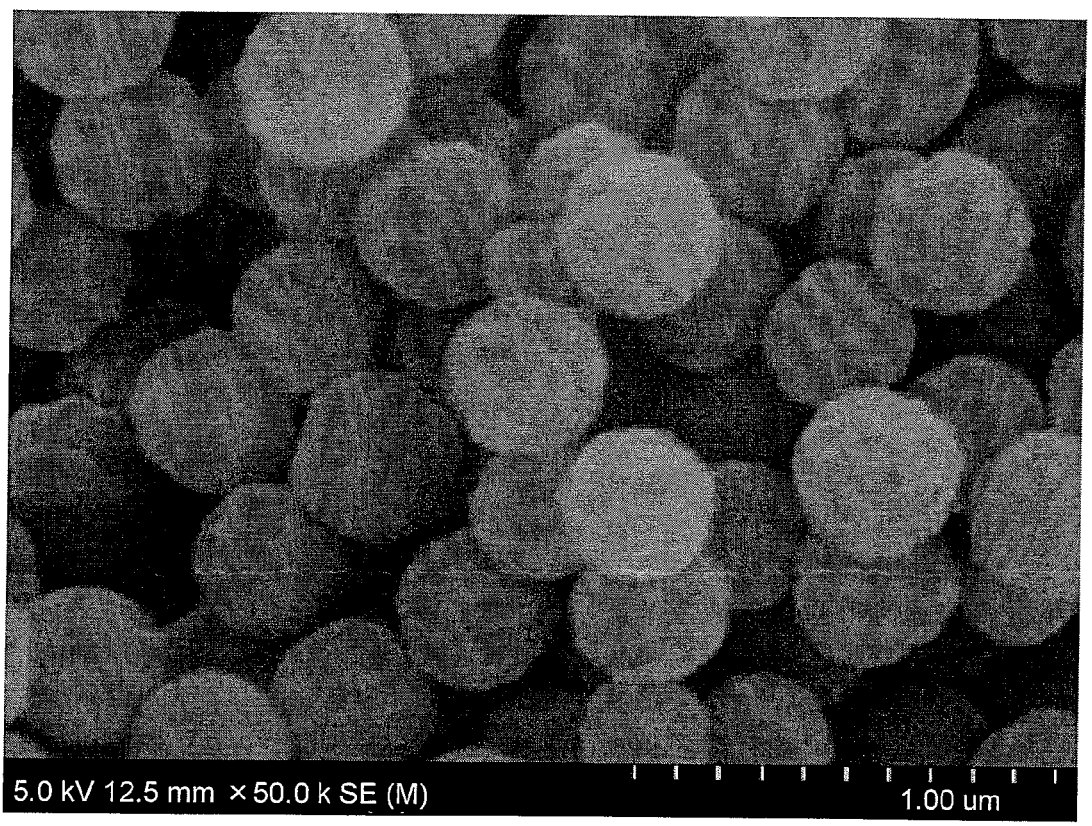
FIG. 3 is a scanning electron microscopic photograph image showing the shape of the non-electroconductive fine particles manufactured in Example 2.

The obtained non-electroconductive particles were measured for the number mean particle diameter, the variation coefficient of the particle diameter, the arithmetic mean value of the shape factor, the variation coefficient of the shape factor, the T10 value, and the metal ion content. The results are shown in Table 1. In addition, the image of the obtained non-electroconductive particles photographed with a scanning electron microscope is shown in FIG. 3. It can be observed that the non-electroconductive particles obtained in this Example are a little more spherical than the non-electroconductive particles obtained in Example 1 (arithmetic mean value of shape factor; 1.16) but obviously have a rougher surface structure than the non-electroconductive particles obtained in Comparative Example 3 (arithmetic mean value of shape factor; 1.04).

2-3. Manufacture of Secondary Battery

Non-electroconductive particles, a separator with a porous membrane, and a secondary battery were manufactured by the same procedure as steps (1-4) to (1-9) of Example 1 except for the following points.

In manufacture of the slurry for a porous membrane in step (1-5), in place of the aqueous dispersion of the non-electroconductive particles obtained in step (1-3), the aqueous dispersion of the non-electroconductive particles obtained in the aforementioned step (2-2) was used.

2-4. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 1.

Example 3

3-1. Manufacture of Seed Polymer Particles B

An aqueous dispersion of seed polymer particles B was manufactured by the same procedure as step (1-2) of Example 1 except for the following points.

In preparing a dispersion of monomer mixture, 1, 76 parts of styrene, 4 parts of t-dodecyl mercaptan, and 2 parts of the monomer mixture 2 (product name: DVB-570) were added in place of 82 parts of styrene.

3-2. Manufacture of Secondary Battery

A separator with a porous membrane and a secondary battery were manufactured by the same procedure as steps (1-3) to (1-9) of Example 1 except for the following points.

In manufacture of the non-electroconductive particles in step (1-3), in place of the seed polymer particles B obtained in step (1-2), the aqueous dispersion of seed polymer particles B obtained in the aforementioned step (3-1) was used.

3-3. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 1.

Moreover, the obtained non-electroconductive particles were measured for the number mean particle diameter, the variation coefficient of the particle diameter, the arithmetic mean value of the shape factor, the variation coefficient of the shape factor, the T10 value, and the metal ion content. The results are shown in Table 1.

Example 4

4-1. Manufacture of Non-Electroconductive Particles

An aqueous dispersion of non-electroconductive particles was obtained by the same procedure as step (1-3) of Example 1 except for the following points.
In place of 5 parts of t-butylperoxy-2-ethylhexanoate, 0.8 parts of potassium persulfate was added.

The obtained non-electroconductive particles were measured for the number mean particle diameter, the variation coefficient of the particle diameter, the arithmetic mean value of the shape factor, the variation coefficient of the shape factor, the T10 value, and the metal ion content. The results are shown in Table 1.

4-2. Manufacture of Secondary Battery

Non-electroconductive particles, a separator with a porous membrane, and a secondary battery were manufactured by the same procedures as steps (1-4) to (1-9) of Example 1 except for the following points.
In manufacture of the slurry for a porous membrane in step (1-5), in place of the aqueous dispersion of the non-electroconductive particles obtained in step (1-3), the aqueous dispersion of the non-electroconductive particles obtained in the aforementioned step (4-1) was used.

4-3. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 1.

Example 5

5-1. Manufacture of Non-Electroconductive Particles

In a reactor equipped with a stirrer, 20 parts in terms of the solid content (i.e., based on the weight of seed polymer particles B) of the aqueous dispersion of seed polymer particles B which was obtained in step (2-1) of Example 2, 100 parts of the monomer mixture 2 (mixture of divinylbenzene and ethylvinylbenzene, monomer mixing ratio: divinylbenzene/ethylvinylbenzene=60/40, produced by Nippon Steel Chemical Co., Ltd., product name: DVB-570), 1.0 part of sodium dodecylbenzenesulfonate, 4 parts of t-butylperoxy-2-ethylhexanoate (produced by NOF CORPORATION, trade name: Perbutyl O) as a polymerization initiator, 540 parts of ion exchange water, 60 parts of isoamyl alcohol, and 200 parts of decane were placed and stirred at 35° C. for 12 hours to allow the seed polymer particles B to completely absorb the monomer mixture 2, the polymerization initiator, and decane. Subsequently, the resultant was polymerized at 90° C. for 7 hours. Then, steam was introduced thereto to remove unreacted monomers, isoamyl alcohol, and decane.

An aqueous dispersion of non-electroconductive particles was thereby obtained.

The obtained non-electroconductive particles were measured for the number mean particle diameter, the variation coefficient of the particle diameter, the arithmetic mean value of the shape factor, the variation coefficient of the shape factor, the T10 value, and the metal ion content. The results are shown in Table 1.

5-2. Manufacture of Secondary Battery

Non-electroconductive particles, a separator with a porous membrane, and a secondary battery were manufactured by the same procedures as steps (1-4) to (1-9) of Example 1 except for the following points.
In manufacture of the slurry for a porous membrane in step (1-5), in place of the aqueous dispersion of the non-electroconductive particles obtained in step (1-3), the aqueous dispersion of the non-electroconductive particles obtained in the aforementioned step (5-1) was used.

5-3. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 1.

Example 6

6-1. Manufacture of Non-Electroconductive Particles

In a reactor equipped with a stirrer, 20 parts in terms of the solid content (i.e., based on the weight of seed polymer particles B) of the aqueous dispersion of seed polymer particles B which was obtained in step (2-1) of Example 2, 100 parts of the monomer mixture 2 (mixture of divinylbenzene and ethylvinylbenzene, monomer mixing ratio: divinylbenzene/ethylvinylbenzene=60/40, produced by Nippon Steel Chemical Co., Ltd., product name: DVB-570), 1.0 part of sodium dodecylbenzenesulfonate, 4 parts of t-butylperoxy-2-ethylhexanoate (produced by NOF CORPORATION, trade name: Perbutyl O) as a polymerization initiator, 540 parts of ion exchange water, and 260 parts of isoamyl alcohol were placed and stirred at 35° C. for 12 hours to allow seed polymer particles B to completely absorb monomer mixture 2 and the polymerization initiator. Subsequently, the resultant was polymerized at 90° C. for 7 hours. Then, steam was introduced thereto to remove unreacted monomers and isoamyl alcohol.

An aqueous dispersion of non-electroconductive particles was thereby obtained.

The obtained non-electroconductive particles were measured for the number mean particle diameter, the variation coefficient of the particle diameter, the arithmetic mean value of the shape factor, the variation coefficient of the shape factor, the T10 value, and the metal ion content. The results are shown in Table 1.

6-2. Manufacture of Secondary Battery

A separator with a porous membrane and a secondary battery were manufactured by the same procedures as steps (1-4) to (1-9) of Example 1 except for the following points.

In manufacture of the slurry for a porous membrane in step (1-5), in place of the aqueous dispersion of the non-electroconductive particles obtained in step (1-3), the aqueous dispersion of the non-electroconductive particles obtained in the aforementioned step (6-1) was used.

6-3. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 1.

Moreover, the obtained non-electroconductive particles were measured for the number mean particle diameter, the variation coefficient of the particle diameter, the arithmetic mean value of the shape factor, the variation coefficient of the shape factor, the T10 value, and the metal ion content. The results are shown in Table 1.

Example 7

7-1. Manufacture of Non-Electroconductive Particles

An aqueous dispersion of non-electroconductive particles was obtained by the same procedure as step (1-3) of Example 1 except for the following points.

In place of 5 parts of t-butylperoxy-2-ethylhexanoate, 1.6 parts of potassium persulfate was added.

The obtained non-electroconductive particles were measured for the number mean particle diameter, the variation coefficient of the particle diameter, the arithmetic mean value of the shape factor, the variation coefficient of the shape factor, the T10 value, and the metal ion content. The results are shown in Table 1.

7-2. Manufacture of Secondary Battery

Non-electroconductive particles, a separator with a porous membrane, and a secondary battery were manufactured by the same procedures as steps (1-4) to (1-9) of Example 1 except for the following points.

In manufacture of the slurry for a porous membrane in step (1-5), in place of the aqueous dispersion of the non-electroconductive particles obtained in step (1-3), the aqueous dispersion of the non-electroconductive particles obtained in the aforementioned step (7-1) was used.

7-3. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 1.

Example 8

8-1. Manufacture of Slurry for Porous Membrane

The aqueous dispersion of the non-electroconductive particles obtained in step (1-3) of Example 1, an aqueous dispersion of SBR (produced by Zeon Corporation, product name: BM-400B), and carboxymethylcellulose (produced by Daicel Corporation, trade name: Daicel 1220) were mixed in water at a solid content weight ratio of 83.1:12.3:4.6 to obtain a slurry for a porous membrane.

8-2. Manufacture of Secondary Battery

A separator with a porous membrane and a secondary battery were manufactured by the same procedures as steps (1-6) to (1-9) of Example 1 except for the following points.

In manufacture of the separator with the porous membrane in step (1-8), in place of the slurry for a porous membrane obtained in step (1-5), the slurry for a porous membrane obtained in the aforementioned step (8-1) was used.

8-3. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 1.

Example 9

9-1. Manufacture of Dried Non-Electroconductive Particles

The aqueous dispersion of the non-electroconductive particles obtained in step (1-3) of Example 1 was spray-dried by a spray dryer (produced by Fujisaki Electric Co. Ltd., trade name: MDL-050M model, inlet temperature: 70° C., outlet temperature: 50° C., amount of feed liquid: 0.6 kg/h) to obtain non-electroconductive particles. The water content of the obtained non-electroconductive particles was measured by the Karl Fischer moisture meter (produced by Kyoto Electronics Manufacturing Co., Ltd., product name: MKC-610) and it was confirmed that the water content was 0.1% or less and the non-electroconductive particles were sufficiently dried.

9-2. Manufacture of Slurry for Porous Membrane

The dried non-electroconductive particle obtained in step (9-1) and PVDF (polyvinylidene fluoride, produced by Kureha Corporation, trade name: KF-1100) were mixed in NMP at a solid content weight ratio of 86.0:14.0 and dispersed by a planetary mixer to prepare a slurry for a porous membrane.

9-3. Manufacture of Secondary Battery

A separator with a porous membrane and a secondary battery were manufactured by the same procedures as steps (1-6) to (1-9) of Example 1 except for the following points.

In manufacture of the separator with the porous membrane in step (1-8), in place of the slurry for a porous membrane obtained in step (1-5), the slurry for a porous membrane obtained in the aforementioned step (9-2) was used.

9-4. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 2.

Example 10

10-1. Manufacture of Seed Polymer Particles C

In a reactor equipped with a stirrer, 10 parts in terms of the solid content (i.e., based on the weight of the seed polymer particles B) of the aqueous dispersion of seed polymer particles B which was obtained in step (1-2), 0.2 parts of sodium dodecylbenzenesulfonate, 1 part of potassium persulfate, and 100 parts of ion exchange water were placed and mixed to obtain a mixture C, and the temperature was raised to 80° C. Separately in a different container, 82 parts of styrene, 15.3 parts of methyl methacrylate, 2.0 parts of itaconic acid, 0.7 parts of acrylamide, 0.3 parts of sodium dodecylbenzenesulfonate, and 100 parts of ion exchange water were mixed to prepare a dispersion of monomer mixture 5. This dispersion of monomer mixture 5 was continuously added to the mixture C obtained above over 4 hours for performing polymerization. The temperature of the reaction system was maintained at 80° C. during continuous addition of the dispersion of the monomer mixture 5 to perform the reaction. After the completion of the continuous addition, the reaction was further continued at 90° C. for 3 hours.

An aqueous dispersion of seed polymer particles C having a number mean particle diameter of 370 nm was thereby obtained.

10-2. Manufacture of Non-Electroconductive Particles

Subsequently, in a reactor equipped with a stirrer, 10 parts in terms of the solid content (i.e., based on the weight of the seed polymer particles C) of the aqueous dispersion of seed polymer particles C which was obtained in step (10-1), 90 parts of the monomer mixture 2 (mixture of divinylbenzene and ethylvinylbenzene, monomer mixing ratio: divinylbenzene/ethylvinylbenzene=60/40, produced by Nippon Steel Chemical Co., Ltd., product name: DVB-570), 1 part of sodium dodecylbenzenesulfonate, 5 parts of t-butylperoxy-2-ethylhexanoate (produced by NOF CORPORATION, trade name: Perbutyl O) as a polymerization initiator, 270 parts of ion exchange water, and 30 parts of ethanol were placed and stirred at 35° C. for 12 hours to allow the seed polymer particles C to completely absorb the monomer mixture 2 and the polymerization initiator. Subsequently, the resultant was polymerized at 90° C. for 7 hours. Then, steam was introduced thereto to remove unreacted monomers and ethanol.

An aqueous dispersion of non-electroconductive particles was thereby obtained.

The obtained non-electroconductive particles were measured for the number mean particle diameter, the variation coefficient of the particle diameter, the arithmetic mean value of the shape factor, the variation coefficient of the shape factor, the T10 value, and the metal ion content. The results are shown in Table 2.

10-3. Manufacture of Secondary Battery

Non-electroconductive particles, a separator with a porous membrane, and a secondary battery were manufactured by the same procedures as steps (1-4) to (1-9) of Example 1 except for the following points.

In manufacture of the slurry for a porous membrane in step (1-5), in place of the aqueous dispersion of the non-electroconductive particles obtained in step (1-3), the aqueous dispersion of the non-electroconductive particles obtained in the aforementioned step (10-2) was used.

10-4. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 2.

Example 11

11-1. Manufacture of Negative Electrode with Porous Membrane

The slurry for a porous membrane obtained in step (1-5) of Example 1 was applied onto the negative electrode mixed material layer side surface of the negative electrode obtained in step (1-7) of Example 1 so that the negative electrode mixed material layer was completely covered and the thickness of the porous membrane after drying was 5 μm, thereby obtaining a slurry layer. The slurry layer was dried at 50° C. for 10 minutes to form a porous membrane, thereby obtaining the negative electrode with the porous membrane. The obtained negative electrode with the porous membrane had a layer structure of (porous membrane)/(negative electrode mixed material layer)/(copper foil).

11-2. Manufacture of Secondary Battery

A secondary battery was manufactured by the same procedures as steps (1-6), (1-8) and (1-9) of Example 1 except for the following points.

In manufacture of the battery in step (1-9), in place of the separator with the porous membrane, an organic separator layer (monolayer separator made of polypropylene, porosity; 55%, thickness; 25 μm, the same as the one used as the organic separator layer in step (1-8) of Example 1) was used as a separator as it was.

In manufacture of the battery in step (1-9), in place of the negative electrode, the negative electrode with the porous membrane obtained in the aforementioned step (11-1) was used. A disc-shaped negative electrode with the porous membrane was placed in an outer container so that the porous membrane side surface thereof was directed to a disc-shaped separator and the copper foil side surface was directed upwardly.

11-3. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 2.

Comparative Example 1

C1-1. Manufacture of Non-Electroconductive Particles

In a container equipped with a stirrer, 400 parts of ion exchange water, 0.4 parts of sodium dodecylbenzenesulfonate, 100 parts of the monomer mixture 2 (mixture of divinylbenzene and ethylvinylbenzene, monomer mixing ratio: divinylbenzene/ethylvinylbenzene=60/40, produced by Nippon Steel Chemical Co., Ltd., product name: DVB-570), and 5 parts of t-butylperoxy-2-ethylhexanoate (produced by NOF CORPORATION, trade name: Perbutyl O) as a polymerization initiator were placed and stirred until rough droplets generated were stabilized.

This mixture was subjected to high-speed shear stirring at the number of revolutions of 15,000 rpm for 1 minute using the in-line type emulsification disperser (produced by Pacific Machinery & Engineering Co., Ltd., trade name: CAVITRON) to obtain a dispersion liquid of a polymerizable monomer composition.

The obtained dispersion liquid was transferred to a reactor equipped with a stirrer and polymerization was performed at 90° C. for 12 hours. Then, steam was introduced thereto to remove unreacted monomers.

An aqueous dispersion of non-electroconductive particles having a number mean particle diameter of 2400 nm was thereby obtained. This aqueous dispersion was processed by a media-type disperser (produced by Willy A. Bachofen, product name: DYNO-MILL) to crush the non-electroconductive particles. An aqueous dispersion of non-electroconductive particles having a number mean particle diameter of 750 nm was thereby obtained.

The obtained non-electroconductive particles were measured for the number mean particle diameter, the variation coefficient of the particle diameter, the arithmetic mean value of the shape factor, the variation coefficient of the shape factor, the T10 value, and the metal ion content. The results are shown in Table 2.

C1-2. Manufacture of Secondary Battery

Non-electroconductive particles, a separator with a porous membrane, and a secondary battery were manufactured by the same procedures as steps (1-4) to (1-9) of Example 1 except for the following points.
In manufacture of the slurry for a porous membrane in step (1-5), in place of the aqueous dispersion of the non-electroconductive particles obtained in step (1-3), the aqueous dispersion of the non-electroconductive particles obtained in the aforementioned step (C1-1) was used.

C1-3. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 2.

Comparative Example 2

C2-1. Centrifugation Treatment of Non-Electroconductive Particles

The aqueous dispersion of the non-electroconductive particles having a number mean particle diameter of 750 nm which was obtained in step (C1-1) of Comparative Example 1 was centrifuged to remove fine powders, thereby obtaining an aqueous dispersion of non-electroconductive particles having a number mean particle diameter of 880 nm.

The obtained non-electroconductive particles were measured for the number mean particle diameter, the variation coefficient of the particle diameter, the arithmetic mean value of the shape factor, the variation coefficient of the shape factor, the T10 value, and the metal ion content. The results are shown in Table 2.

C2-2. Manufacture of Secondary Battery

Non-electroconductive particles, a separator with a porous membrane, and a secondary battery were manufactured by the same procedures as steps (1-4) to (1-9) of Example 1 except for the following points.
In manufacture of the slurry for a porous membrane in step (1-5), in place of the aqueous dispersion of the non-electroconductive particles obtained in step (1-3), the aqueous dispersion of the non-electroconductive particles obtained in the aforementioned step (C2-1) was used.

C2-3. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 2.

Comparative Example 3

C3-1. Manufacture of Non-Electroconductive Particles

In a reactor equipped with a stirrer, 99 parts of the monomer mixture 2 (product name: DVB-570, mixture of divinylbenzene and ethylvinylbenzene, the same as the one used in step (1-3) of Example 1), 1.0 part of methacrylic acid, 20 parts of polyvinylpyrrolidone, 1 part of potassium persulfate, 1 part of t-butylperoxy-2-ethylhexanoate (produced by NOF CORPORATION, trade name: Perbutyl O), and 900 parts of ethanol were placed and polymerization was performed at 70° C. for 24 hours.

An ethanol dispersion of non-electroconductive particles having an mean particle diameter of 550 nm was thereby obtained.

Figure 2:
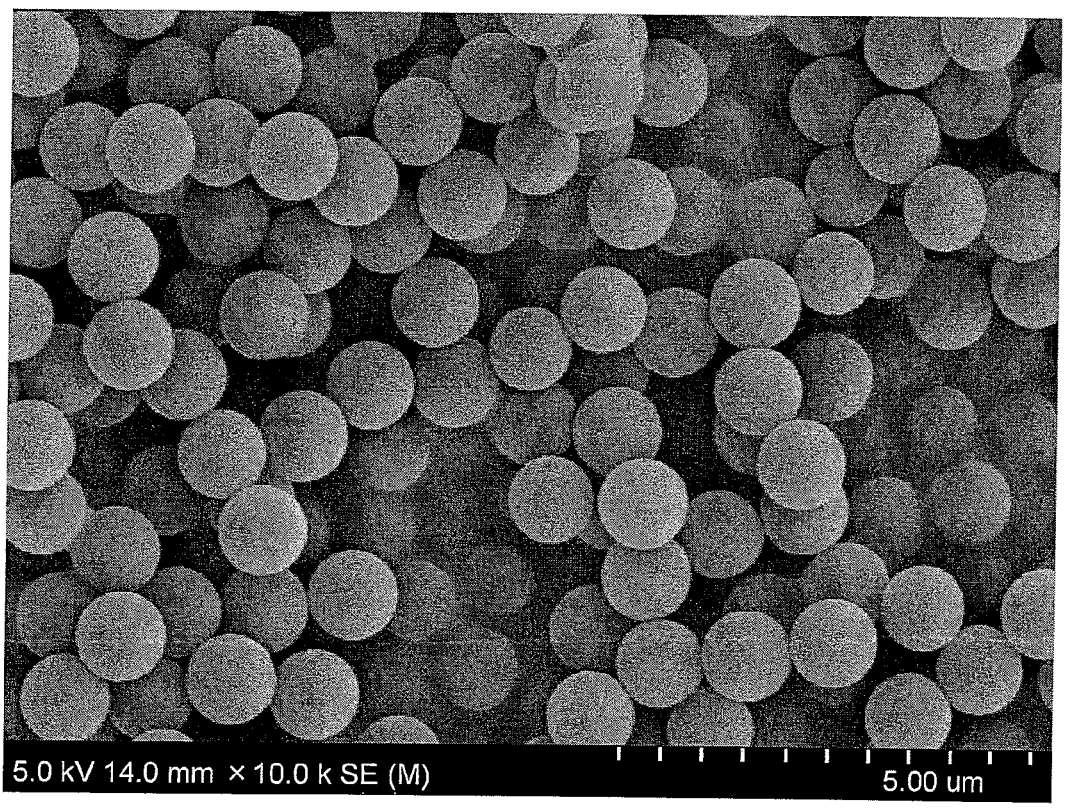
FIG. 2 is a scanning electron microscopic photograph image showing the shape of the non-electroconductive fine particles manufactured in Comparative Example 3.

The obtained non-electroconductive particles were measured for the number mean particle diameter, the variation coefficient of the particle diameter, the arithmetic mean value of the shape factor, the variation coefficient of the shape factor, the T10 value, and the metal ion content. The results are shown in Table 2. In addition, the image of the obtained non-electroconductive particles photographed with a scanning electron microscope is shown in FIG. 2. It can be observed that the non-electroconductive particles obtained in this Comparative Example (arithmetic mean value of shape factor; 1.04) obviously has a more spherical structure than the non-electroconductive particles obtained in Example 1 (arithmetic mean value of shape factor; 1.16).

C3-2. Manufacture of Secondary Battery

Non-electroconductive particles, a separator with a porous membrane, and a secondary battery were manufactured by the same procedures as steps (1-4) to (1-9) of Example 1 except for the following points.

In manufacture of the slurry for a porous membrane in step (1-5), in place of the aqueous dispersion of the non-electroconductive particles obtained in step (1-3), the aqueous dispersion of the non-electroconductive particles obtained in the aforementioned step (C3-1) was used.

C3-3. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 2.

Comparative Example 4

C4-1. Manufacture of Slurry for Porous Membrane

Alumina having a number mean particle diameter of 0.68 μm, the particles of the binder for a porous membrane, and carboxymethylcellulose (produced by Daicel Corporation, trade name: Daicel 1220) were mixed in water at a solid content weight ratio of 94.8:3.8:1.4, and dispersed by a planetary mixer to prepare a slurry for a porous membrane.

For alumina used, the variation coefficient of the particle diameter, the arithmetic mean value of the shape factor, the variation coefficient of the shape factor, the T10 value, and the metal ion content are as shown in Table 2.

C4-2. Manufacture of Secondary Battery

A separator with a porous membrane and a secondary battery were manufactured by the same procedures as steps (1-6) to (1-9) of Example 1 except for the following points.

In manufacture of the separator with the porous membrane in step (1-8), in place of the slurry for a porous membrane obtained in step (1-5), the slurry for a porous membrane obtained in the aforementioned step (C4-1) was used.

C4-3. Evaluation

The obtained separator with the porous membrane was evaluated for the powder falling property of the porous membrane, the water content, the reliability, and the uniformity. In addition, the obtained secondary battery was evaluated for the cycle property. The results are shown in Table 2.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Arithmetic mean value of shape factor | 1.16 | 1.11 | 1.21 | 1.17 | 1.55 | 1.40 | 1.15 | 1.16 |
| Variation coefficient of shape factor | 4.0% | 2.7% | 9.5% | 5.1% | 14.5% | 11.7% | 4.6% | 4.0% |
| Variation coefficient of particle diameter | 14.5% | 12.5% | 13.8% | 18.0% | 14.2% | 11.8% | 25.0% | 14.5% |
| Binder species | Acryl | Acryl | Acryl | Acryl | Acryl | Acryl | Acryl | SBR |
| Number mean particle diameter | 352 nm | 358 nm | 355 nm | 338 nm | 360 nm | 366 nm | 328 nm | 352 nm |
| Particle T10 | 380° C. | 380° C. | 380° C. | 380° C. | 380° C. | 380° C. | 380° C. | 380° C. |
| Object for porous membrane formation | Separator | Separator | Separator | Separator | Separator | Separator | Separator | Separator |
| Metal ion amount | Good | Good | Good | Good | Good | Good | Good | Good |
| Water content | A | A | A | A | A | A | A | A |
| Porous membrane uniformity | A | A | A | A | C | B | B | A |
| Powder falling | A | A | B | A | C | C | A | C |
| High temperature short circuit test | Good | Good | Good | Good | Good | Good | Good | Good |

TABLE 1-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Battery cycle property | A | B | A | B | A | A | C | C |

TABLE 2

|  | Ex. 9 | Ex. 10 | Ex. 11 | Comp. Ex. 1 | Comp. Ex. 2 | Comp. Ex. 3 | Comp. Ex. 4 |
|---|---|---|---|---|---|---|---|
| Arithmetic mean value of shape factor | 1.16 | 1.16 | 1.16 | 1.65 | 1.65 | 1.04 | 2.07 |
| Variation coefficient of shape factor | 4.0% | 4.0% | 4.0% | 21% | 21% | 2.0% | 23.1% |
| Variation coefficient of particle diameter | 14.5% | 14.5% | 14.5% | 45% | 20% | 5.8% | 27.9% |
| Binder species | PVDF | Acryl | Acryl | Acryl | Acryl | Acryl | Acryl |
| Number mean particle diameter | 352 nm | 698 nm | 352 nm | 750 nm | 880 nm | 920 nm | 680 nm |
| Particle T10 | 380° C. | 380° C. | 380° C. | 380° C. | 380° C. | 380° C. | <1100° C. |
| Object for porous membrane formation | Separator | Separator | Negative electrode | Separator | Separator | Separator | Separator |
| Metal ion amount | Good | Good | Good | Good | Good | Good | Poor |
| Water content | A | A | A | A | A | A | D |
| Porous membrane uniformity | A | B | A | C | B | A | C |
| Powder falling | C | A | A | D | D | A | C |
| High temperature short circuit test | Good | Good | Good | Poor | Poor | Poor | Good |
| Battery cycle property | C | A | A | B | B | C | D |

The meaning of each of the abbreviations in Tables is as follows.

Arithmetic mean value of shape factor: Arithmetic mean value of shape factor of non-electroconductive particles.

Variation coefficient of shape factor: Variation coefficient of shape factor of non-electroconductive particles.

Variation coefficient of particle diameter: Variation coefficient of particle diameter of non-electroconductive particles.

Binder species: Species of binder for porous membrane. Acryl: Acrylic polymer, SBR: Aqueous dispersion of SBR (produced by ZEON Corporation, product name: BM-400B), PVDF: Polyvinylidene fluoride.

Number mean particle diameter: Number mean particle diameter of non-electroconductive particles.

Particle T10: T10 value of non-electroconductive particles (temperature (° C.) at which the reduced ratio reaches 10% by weight when heated in a thermobalance under a nitrogen atmosphere at a heating rate of 10° C./minute.).

Object for porous membrane formation: Object on which porous membrane was formed. Separator or Negative electrode.

Metal ion amount: Metal ion content of non-electroconductive particles. The results evaluated as stated above.

Water content: Water content of electrode with porous membrane or separator with porous membrane. The results evaluated as stated above.

Porous membrane uniformity: Uniformity of electrode with porous membrane or separator with porous membrane. The results evaluated as stated above.

Powder falling: Evaluation results of powder falling property of electrode with porous membrane or separator with porous membrane.

High temperature short circuit test: Evaluation results of reliability test of electrode with porous membrane or separator with porous membrane.

Battery cycle property: Evaluation results of cycle property test of battery.

As shown in the results of Table 1 and Table 2, in Examples 1 to 11 which satisfy the requirements of the present invention, by using as non-electroconductive particles the particles of a polymer of which the arithmetic mean value of the shape factor, the variation coefficient of the shape factor, and the variation coefficient of the particle diameter fall within respective specific ranges, good results were obtained for the metal ion amount and the water content, and well-balanced good results were obtained as to the porous membrane uniformity, the powder falling, the high temperature short circuit test, and the battery cycle property.

In contrast thereto, in the case of using as non-electroconductive particles the particles of a polymer of which the arithmetic mean value of the shape factor, the variation coefficient of the shape factor, and the variation coefficient of the particle diameter were out of the specific ranges (Comparative Example 1), the case of using the particles of a polymer of which the mean value of the shape factor and the variation coefficient of the shape factor were out of the specific ranges (Comparative Example 2), and the case of using the particles of a polymer of which the arithmetic mean value of the shape factor was out of the specific range (Comparative Example 3), although good results were obtained in the metal ion amount and the water content, a poor result was obtained in at least one of the porous membrane uniformity, the powder falling, the high temperature short circuit test, and the battery cycle property. In the case of using as non-electroconductive particles the alumina particles of which the arithmetic mean value of the shape factor, the variation coefficient of the shape factor, and the variation coefficient of the particle diameter fall within the specific ranges (Comparative Example 4), although a good result was obtained in the high temperature short circuit test, poor results were obtained in the metal ion amount, the water content, the porous membrane uniformity, the powder falling, and the battery cycle property.

Example 12

12-1. Manufacture of Seed Polymer Particles A

In a reactor equipped with a stirrer, 100 parts of styrene, 1.0 part of sodium dodecylbenzenesulfonate, 100 parts of ion exchange water, and 0.5 parts of potassium persulfate were placed and polymerization was performed at 80° C. for 8 hours.

An aqueous dispersion of seed polymer particles A having a number mean particle diameter of 60 nm was thereby obtained.

12-2. Manufacture of Seed Polymer Particles B

In a reactor equipped with a stirrer, 2 parts in terms of the solid content (i.e., based on the weight of seed polymer particles A) of the aqueous dispersion of seed polymer particles A which was obtained in step (12-1), 0.2 parts of sodium dodecylbenzenesulfonate, 0.5 parts of potassium persulfate, and 100 parts of ion exchange water were placed and mixed to obtain a mixture A, and the temperature was raised to 80° C. Separately in a different container, 97 parts of styrene, 3 parts of methacrylic acid, 4 parts of t-dodecyl mercaptan, 0.5 parts of sodium dodecylbenzenesulfonate, and 100 parts of ion exchange water were mixed to prepare a dispersion of monomer mixture 1. This dispersion of monomer mixture 1 was continuously added to the mixture A obtained above over 4 hours for performing polymerization. The temperature of the reaction system was maintained at 80° C. during continuous addition of the dispersion of monomer mixture 1 to perform the reaction. After the completion of the continuous addition, the reaction was further continued at 90° C. for 3 hours.

An aqueous dispersion of seed polymer particles B having a number mean particle diameter of 200 nm was thereby obtained.

12-3. Manufacture of Non-Electroconductive Particles

Subsequently, in a reactor equipped with a stirrer, 10 parts in terms of the solid content (i.e., based on the weight of the seed polymer particles B) of the aqueous dispersion of the seed polymer particles B which was obtained in step (12-2), 90 parts of the monomer mixture 2 (mixture of divinylbenzene and ethylvinylbenzene, monomer mixing ratio: divinylbenzene/ethylvinylbenzene=60/40, produced by Nippon Steel Chemical Co., Ltd., product name: DVB-570), 1 part of sodium dodecylbenzenesulfonate, 5 parts of t-butylperoxy-2-ethylhexanoate (produced by NOF CORPORATION, trade name: Perbutyl O) as a polymerization initiator, and 200 parts of ion exchange water were placed and stirred at 35° C. for 12 hours to allow the seed polymer particles B to completely absorb the monomer mixture 2 and the polymerization initiator. Subsequently, the resultant was polymerized at 90° C. for 4 hours. Then, steam was introduced thereto to remove unreacted monomers.

An aqueous dispersion of non-electroconductive particles having a number mean particle diameter of 400 nm was thereby obtained, and properties thereof were measured.

The weight ratio of each monomer with respect to the total of the monomers (styrene, methacrylic acid which is a polar group-containing monomer, divinylbenzene, and ethylvinylbenzene) which were used from formation of the seed polymer to production of the non-electroconductive particles is as follows. 9.7% of styrene, 0.3% of methacrylic acid, 54% of divinylbenzene, and 36% of ethylvinylbenzene. The T10 value of the non-electroconductive particles was 380° C.

The variation coefficient of the particle diameter of the non-electroconductive particles was 16.0%, the arithmetic mean value of the shape factor was 1.17, the variation coefficient of the shape factor was 5.2%, and the metal ion content was less than 50 ppm.

12-4. Manufacture of Binder for Porous Membrane

In the same manner as in (1-4) of Example 1, an aqueous dispersion liquid of a binder for a porous membrane, which has an mean particle diameter of 100 nm and a solid content concentration of 40%, was obtained.

12-5. Manufacture of Slurry for Porous Membrane

The aqueous dispersion of the non-electroconductive particles obtained in step (12-3), the aqueous dispersion liquid of the binder for a porous membrane obtained in step (12-4), and carboxymethylcellulose (produced by Daicel Corporation, trade name: Daicel 1220) were mixed in water at a solid content weight ratio of 83.1:12.3:4.6 to obtain a slurry for a porous membrane.

12-6. Manufacture of Positive Electrode

To 95 parts of $LiCoO_2$ as a positive electrode active material, 3 parts in terms of the solid content of PVDF (polyvinylidene fluoride, produced by Kureha Corporation, trade name: KF-1100) as a binder was added, and 2 parts of acetylene black and 20 parts of N-methylpyrrolidone were further added thereto and mixed by a planetary mixer to obtain an electrode composition for a positive electrode in a slurry form. This positive electrode composition was applied onto one side of aluminum foil having a thickness of 18 μm and dried at 120° C. for 3 hours. Then roll press was performed, to thereby obtain a positive electrode having a positive electrode mixed material layer and having an overall thickness of 100 μm.

12-7. Manufacture of Negative Electrode

In the same manner as in (1-7) of Example 1, a negative electrode having a negative electrode mixed material layer and having an overall thickness of 100 μm and was obtained.

12-8. Manufacture of Separator with Porous Membrane

A monolayer separator made of polypropylene (porosity; 55%, thickness; 25 μm) manufactured by the dry method was prepared as an organic separator layer. The slurry for a porous membrane obtained in step (12-5) was applied onto one side of this organic separator layer so that the thickness after drying was 5 μm, thereby obtaining a slurry layer. The slurry layer was dried at 50° C. for 10 minutes to form a porous membrane. Subsequently, the porous membrane was also formed similarly on the other side of the organic separator layer. A separator with the porous membrane, which has the porous membranes on both sides, was thus obtained.

12-9. Manufacture of Secondary Battery Having Separator with Porous Membrane The positive electrode obtained in step (12-6) was cut out in a form of a disc having a diameter of 13 mm to obtain a disc-shaped positive electrode. The negative electrode obtained in step (12-7) was cut out in a form of a disc having a diameter of 14 mm to obtain a disc-shaped negative electrode. The separator with the porous membrane obtained in step (12-8) was cut out in a form of a disc having a diameter of 18 mm to obtain a disc-shaped separator with the porous membrane.

The disc-shaped positive electrode was placed on the inner bottom of a coin-type outer container made of stainless steel equipped with a gasket made of polypropylene, the disc-shaped separator with the porous membrane was placed thereon, and the disc-shaped negative electrode was further placed thereon, to accommodate them in a container. The disc-shaped positive electrode was placed so that the aluminum foil side surface thereof was directed to the bottom of the outer container and the positive electrode mixed material layer side surface was directed upwardly. The disc-shaped negative electrode was placed so that the negative electrode mixed material layer side surface thereof was directed to the disc-shaped separator with the porous membrane and the copper foil side surface was directed upwardly.

An electrolytic solution was injected into the container such that air did not remain, and the outer container was covered with a stainless steel cap having a thickness of 0.2 mm via a gasket made of polypropylene and fastened to seal a battery can, thereby manufacturing a lithium ion secondary battery having a diameter of 20 mm and a thickness of about 3.2 mm (coin cell CR2032). As the electrolytic solution, a solution was used in which 1 mol/L of $LiPF_6$ was dissolved in a mixed solvent of ethylene carbonate (EC) and diethyl carbonate (DEC) at EC:DEC 1:2 (volume ratio at 20° C.)

12-10. Evaluation

The obtained slurry for a porous membrane, separator with the porous membrane, and secondary battery were evaluated for a variety of properties.

The obtained slurry for a porous membrane was left stand for 24 hours, and the storage stability of the slurry was visually checked. As a result, no aggregation nor sedimentation of a filler was observed. It was thus found out that the slurry has good storage stability.

The uniformity of the porous membrane on the obtained separator with the porous membrane was evaluated as A (less than 3%).

The reliability of the obtained separator with the porous membrane was evaluated as good (without generation of short circuit).

The powder falling of the porous membrane on the obtained separator with the porous membrane was evaluated as A (no adhesion of a porous membrane piece was observed even after 1000 times of punching).

The water content of the porous membrane on the obtained separator with the porous membrane was measured and evaluated as A (less than 200 μg/cc).

The obtained coin type secondary battery was repeatedly charged and discharged, in which a procedure of charging to 4.3 V with a constant current of 0.2 C and then discharging to 3.0 V with a constant current of 0.2 C at 20° C. was defined as one cycle. The ratio of the discharge capacity at the 100th cycle with respect to the discharge capacity at the 2nd cycle was calculated by percentage, and found out to be 95% or more.

The invention claimed is:

1. A porous membrane for a secondary battery comprising non-electroconductive particles and a binder for a porous membrane, wherein:
    the non-electroconductive particles are particles of a polymer,
    an arithmetic mean value of a shape factor of the non-electroconductive particles is 1.05 to 1.60,
    a variation coefficient of the shape factor is 16% or less,
    a variation coefficient of a particle diameter of the non-electroconductive particles is 26% or less,
    the binder for the porous membrane is a (meth)acrylic polymer,
    a content ratio of a polymerization unit of a (meth)acrylate ester monomer in the (meth)acrylic polymer is 50% to 98% by weight,
    a number mean particle diameter of the binder for the porous membrane is 70 to 400 nm, and
    a content ratio of the (meth)acrylic polymer in the porous membrane for the secondary battery is 3% to 20% by weight.

2. The porous membrane for a secondary battery according to claim 1, wherein a number mean particle diameter of the non-electroconductive particles is 100 to 1000 nm.

3. The porous membrane for a secondary battery according to claim 1, wherein the number mean particle diameter of the binder for the porous membrane is 100 to 250 nm.

4. The porous membrane for a secondary battery according to claim 1, wherein a temperature at which a ratio of reduced amount of the non-electroconductive particles reaches 10% by weight when heated in a thermobalance at a heating rate of 10° C./minute under a nitrogen atmosphere is 360° C. or more.

5. A method for manufacturing the porous membrane for a secondary battery according to claim 1, comprising:
polymerizing a polymerizable monomer composition to obtain non-electroconductive particles having an arithmetic mean value of a shape factor of 1.05 to 1.60, a variation coefficient of the shape factor of 16% or less, and a variation coefficient of a particle diameter of 26% or less;
mixing the non-electroconductive particles, a binder for a porous membrane, and a medium to obtain a slurry for a porous membrane containing these;
applying the slurry for a porous membrane onto a substrate to obtain a slurry layer; and
drying the slurry layer.

6. The method according to claim 5, wherein
the binder for a porous membrane is a (meth)acrylic polymer,
the medium is a water-based medium, and
the step of obtaining the slurry for a porous membrane includes obtaining the slurry for a porous membrane as an aqueous dispersion.

7. An electrode for a secondary battery, comprising:
a current collector;
an electrode mixed material layer which includes an electrode active material and a binding agent for an electrode mixed material layer, the electrode mixed material layer adhering on the current collector; and
the porous membrane according to claim 1 which is formed on the surface of the electrode mixed material layer.

8. A separator for a secondary battery comprising an organic separator layer and the porous membrane according to claim 1 which is formed on the organic separator layer.

9. A secondary battery comprising a positive electrode, a negative electrode, a separator, and an electrolytic solution, in which at least any of the positive electrode, the negative electrode, and the separator has the porous membrane according to claim 1.

* * * * *